United States Patent
Schneider et al.

(10) Patent No.: US 10,463,109 B2
(45) Date of Patent: *Nov. 5, 2019

(54) HOMING MECHANISM FOR AUTOMATED FOOTWEAR PLATFORM

(71) Applicant: NIKE, Inc., Beaverton, OR (US)

(72) Inventors: Summer L. Schneider, Portland, OR (US); Jamie Kelso, Portland, OR (US); Narissa Chang, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/459,754

(22) Filed: Mar. 15, 2017

(65) Prior Publication Data
US 2017/0265586 A1 Sep. 21, 2017

Related U.S. Application Data

(60) Provisional application No. 62/308,728, filed on Mar. 15, 2016.

(51) Int. Cl.
*A43C 11/16* (2006.01)
*A43C 11/00* (2006.01)
(Continued)

(52) U.S. Cl.
CPC .......... *A43C 11/165* (2013.01); *A43B 3/0005* (2013.01); *A43B 13/14* (2013.01);
(Continued)

(58) Field of Classification Search
CPC ....... A43B 13/14; A43B 3/0005; A43B 3/001; A43C 1/00; A43C 11/008; A43C 11/14; A43C 11/165; A43C 7/00; A43C 7/08
See application file for complete search history.

(56) References Cited

U.S. PATENT DOCUMENTS

| 64,155 | A | * | 4/1867 | Sickels | .............. | A43C 11/1406 |
| | | | | | | 24/68 SK |
| 3,808,644 | A | * | 5/1974 | Schoch | .................. | A43C 11/16 |
| | | | | | | 24/68 SK |

(Continued)

FOREIGN PATENT DOCUMENTS

| CN | 109414093 A | 3/2019 |
| JP | 2019508185 A | 3/2019 |
| WO | 2017160977 | 9/2017 |

OTHER PUBLICATIONS

"International Application Serial No. PCT/US2017/022500, International Search Report dated Jan. 20, 2017", 4 pgs.
(Continued)

*Primary Examiner* — Jila M Mohandesi
(74) *Attorney, Agent, or Firm* — Schwegman Lundberg & Woessner, P.A.

(57) ABSTRACT

Systems, methods, and apparatus related to a homing mechanism within a drive mechanism of a lacing engine for an automated footwear platform are described. In an example, the homing apparatus can include an indexing wheel, a plurality of Geneva teeth and a stop tooth. The plurality of Geneva teeth can be distributed around a portion of a perimeter of the indexing wheel. Each Geneva tooth of the plurality of Geneva teeth can include side profiles conforming to a first side profile that generates a first force when engaged by an index tooth on a portion of the drive mechanism. The stop tooth can be located along the perimeter of the indexing wheel between two Geneva teeth. Additionally, the stop tooth can include side profiles conforming to a second side profile that generates a second force when engaged by the index tooth.

16 Claims, 20 Drawing Sheets

(51) Int. Cl.
*A43B 3/26* (2006.01)
*A43B 3/00* (2006.01)
*A43B 13/14* (2006.01)
*A43C 1/00* (2006.01)

(52) U.S. Cl.
CPC .............. *A43C 1/00* (2013.01); *A43C 11/008* (2013.01); *B65H 2403/542* (2013.01)

(56) References Cited

U.S. PATENT DOCUMENTS

| | | | | |
|---|---|---|---|---|
| 5,934,599 | A * | 8/1999 | Hammerslag | A43C 1/00 242/396.1 |
| 5,983,530 | A * | 11/1999 | Chou | A43C 1/04 36/118.1 |
| 6,896,128 | B1 * | 5/2005 | Johnson | A43C 1/06 36/118.1 |
| 7,721,468 | B1 * | 5/2010 | Johnson | A43C 1/06 36/118.1 |
| 8,904,672 | B1 * | 12/2014 | Johnson | A43C 11/165 36/138 |
| 9,693,605 | B2 * | 7/2017 | Beers | A61F 5/028 |
| 9,861,165 | B2 * | 1/2018 | Schneider | A43C 11/165 |
| 9,961,963 | B2 * | 5/2018 | Schneider | A43C 11/165 |
| 2002/0095750 | A1 * | 7/2002 | Hammerslag | A43B 5/16 24/68 SK |
| 2003/0204938 | A1 | 11/2003 | Hammerslag | |
| 2006/0156584 | A1 | 7/2006 | Johnson | |
| 2008/0301919 | A1 | 12/2008 | Ussher | |
| 2014/0068838 | A1 | 3/2014 | Beers et al. | |
| 2014/0082963 | A1 | 3/2014 | Beers | |
| 2018/0289110 | A1 | 10/2018 | Bock et al. | |
| 2018/0368526 | A1 | 12/2018 | Bock et al. | |

OTHER PUBLICATIONS

"International Application Serial No. PCT/US2017/022500, Written Opinion dated Jun. 20, 2017", 4 pgs.
"International Application Serial No. PCT US2017 022500, International Preliminary Report on Patentability dated Sep. 27, 2018", 6 pgs.

* cited by examiner

| MOVE (SPOOL) | ACCEL (DEG/S/S) | VEL (DEG/S) | DEC (DEG/S/S) | ANGLE (DEG) |
|---|---|---|---|---|
| HOME TO COMFORT | 100 | 400 | 200 | 550 |
| SEGMENT | 400 | 100 | 400 | 30 |
| COMFORT TO PERFORMANCE | 100 | 400 | 200 | 550 |
| RELAX | 50 | 5 | 50 | -5 |
| RETURN TO HOME | 100 | 400 | 200 | 550 |
| FIND HOME | 100 | 10 | | |
| UNTANGLE 1 | | | | |

FIG. 5

HOMING MECHANISM FOR AUTOMATED FOOTWEAR PLATFORM

CLAIM OF PRIORITY

This application claims the benefit of priority of U.S. Provisional Patent Application Ser. No. 62/308,728, filed on Mar. 15, 2016, which is incorporated by reference herein in its entirety.

The following specification describes various aspects of a motorized lacing system, motorized and non-motorized lacing engines, footwear components related to the lacing engines, automated lacing footwear platforms, and related assembly processes. More specifically, the following specification describes motor control methods for use within a motorized lacing engine for an automated footwear platform.

BACKGROUND

Devices for automatically tightening an article of footwear have been previously proposed. Liu, in U.S. Pat. No. 6,691,433, titled "Automatic tightening shoe", provides a first fastener mounted on a shoe's upper portion, and a second fastener connected to a closure member and capable of removable engagement with the first fastener to retain the closure member at a tightened state. Liu teaches a drive unit mounted in the heel portion of the sole. The drive unit includes a housing, a spool rotatably mounted in the housing, a pair of pull strings and a motor unit. Each string has a first end connected to the spool and a second end corresponding to a string hole in the second fastener. The motor unit is coupled to the spool. Liu teaches that the motor unit is operable to drive rotation of the spool in the housing to wind the pull strings on the spool for pulling the second fastener towards the first fastener. Liu also teaches a guide tube unit that the pull strings can extend through.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4-7 are diagrams illustrating a motor control scheme for a motorized lacing engine, according to some example embodiments.

Figure 1:
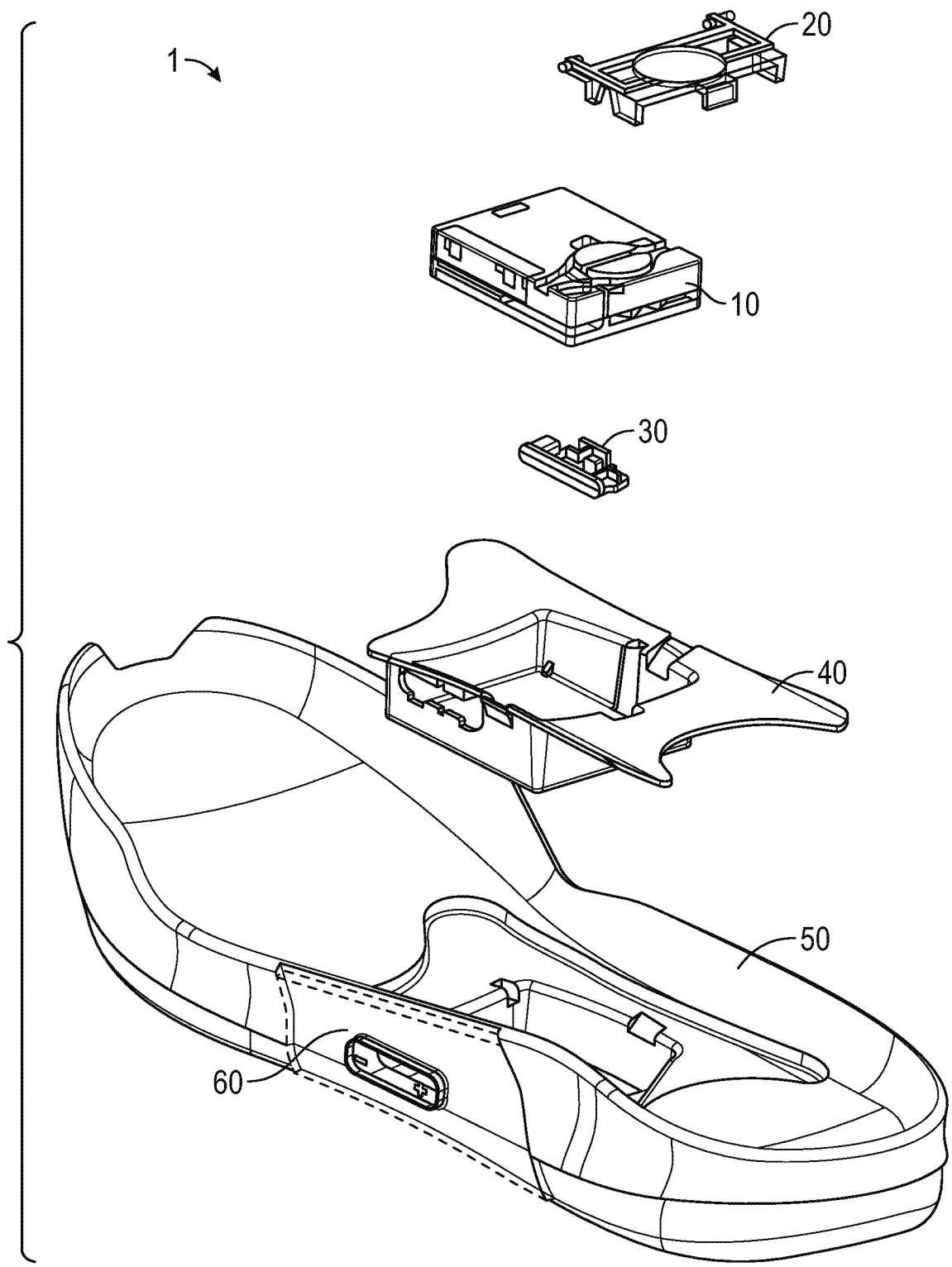
FIG. 1 is an exploded view illustration of components of a motorized lacing system, according to some example embodiments.

The headings provided herein are merely for convenience and do not necessarily affect the scope or meaning of the terms used.

DETAILED DESCRIPTION

The concept of self-tightening shoe laces was first widely popularized by the fictitious power-laced Nike® sneakers worn by Marty McFly in the movie Back to the Future II, which was released back in 1989. While Nike® has since released at least one version of power-laced sneakers similar in appearance to the movie prop version from Back to the Future II, the internal mechanical systems and surrounding footwear platform employed in these early versions do not necessarily lend themselves to mass production or daily use. Additionally, previous designs for motorized lacing systems comparatively suffered from problems such as high cost of manufacture, complexity, assembly challenges, lack of serviceability, and weak or fragile mechanical mechanisms, to highlight just a few of the many issues. The present inventors have developed a modular footwear platform to accommodate motorized and non-motorized lacing engines that solves some or all of the problems discussed above, among others. The components discussed below provide various benefits including, but not limited to: serviceable components, interchangeable automated lacing engines, robust mechanical design, reliable operation, streamlined assembly processes, and retail-level customization. Various other benefits of the components described below will be evident to persons of skill in the relevant arts.

The motorized lacing engine discussed below was developed from the ground up to provide a robust, serviceable, and inter-changeable component of an automated lacing footwear platform. The lacing engine includes unique design elements that enable retail-level final assembly into a modular footwear platform. The lacing engine design allows for the majority of the footwear assembly process to leverage known assembly technologies, with unique adaptions to standard assembly processes still being able to leverage current assembly resources.

In an example, the modular automated lacing footwear platform includes a mid-sole plate secured to the mid-sole for receiving a lacing engine. The design of the mid-sole plate allows a lacing engine to be dropped into the footwear platform as late as at a point of purchase. The mid-sole plate, and other aspects of the modular automated footwear platform, allow for different types of lacing engines to be used interchangeably. For example, the motorized lacing engine discussed below could be changed out for a human-powered lacing engine. Alternatively, a fully-automatic motorized lacing engine with foot presence sensing or other optional features could be accommodated within the standard mid-sole plate.

The automated footwear platform discussed herein can include a motorized lacing engine to provide automatic (or user activated) tightening of laces within a footwear platform. The motorized lacing engine utilizes custom motor control routines to provide certain lacing tightening functions for the footwear platform.

This initial overview is intended to introduce the subject matter of the present patent application. It is not intended to provide an exclusive or exhaustive explanation of the various inventions disclosed in the following more detailed description.

Automated Footwear Platform

The following discusses various components of the automated footwear platform including a motorized lacing engine, a mid-sole plate, and various other components of the platform. While much of this disclosure focuses on a motorized lacing engine, many of the mechanical aspects of the discussed designs are applicable to a human-powered lacing engine or other motorized lacing engines with additional or fewer capabilities. Accordingly, the term "automated" as used in "automated footwear platform" is not intended to only cover a system that operates without user input. Rather, the term "automated footwear platform" includes various electrically powered and human-power, automatically activated and human activated mechanisms for tightening a lacing or retention system of the footwear.

FIG. 1 is an exploded view illustration of components of a motorized lacing system for footwear, according to some example embodiments. The motorized lacing system 1 illustrated in FIG. 1 includes a lacing engine 10, a lid 20, an actuator 30, a mid-sole plate 40, a mid-sole 50, and an outsole 60. FIG. 1 illustrates the basic assembly sequence of components of an automated lacing footwear platform. The motorized lacing system 1 starts with the mid-sole plate 40 being secured within the mid-sole. Next, the actuator 30 is inserted into an opening in the lateral side of the mid-sole plate opposite to interface buttons that can be embedded in the outsole 60. Next, the lacing engine 10 is dropped into the mid-sole plate 40. In an example, the lacing system 1 is inserted under a continuous loop of lacing cable and the lacing cable is aligned with a spool in the lacing engine 10 (discussed below). Finally, the lid 20 is inserted into grooves in the mid-sole plate 40, secured into a closed position, and latched into a recess in the mid-sole plate 40. The lid 20 can capture the lacing engine 10 and can assist in maintaining alignment of a lacing cable during operation.

In an example, the footwear article or the motorized lacing system 1 includes or is configured to interface with one or more sensors that can monitor or determine a foot presence characteristic. Based on information from one or more foot presence sensors, the footwear including the motorized lacing system 1 can be configured to perform various functions. For example, a foot presence sensor can be configured to provide binary information about whether a foot is present or not present in the footwear. If a binary signal from the foot presence sensor indicates that a foot is present, then the motorized lacing system 1 can be activated, such as to automatically tighten or relax (i.e., loosen) a footwear lacing cable. In an example, the footwear article includes a processor circuit that can receive or interpret signals from a foot presence sensor. The processor circuit can optionally be embedded in or with the lacing engine 10, such as in a sole of the footwear article.

Figure 2A:
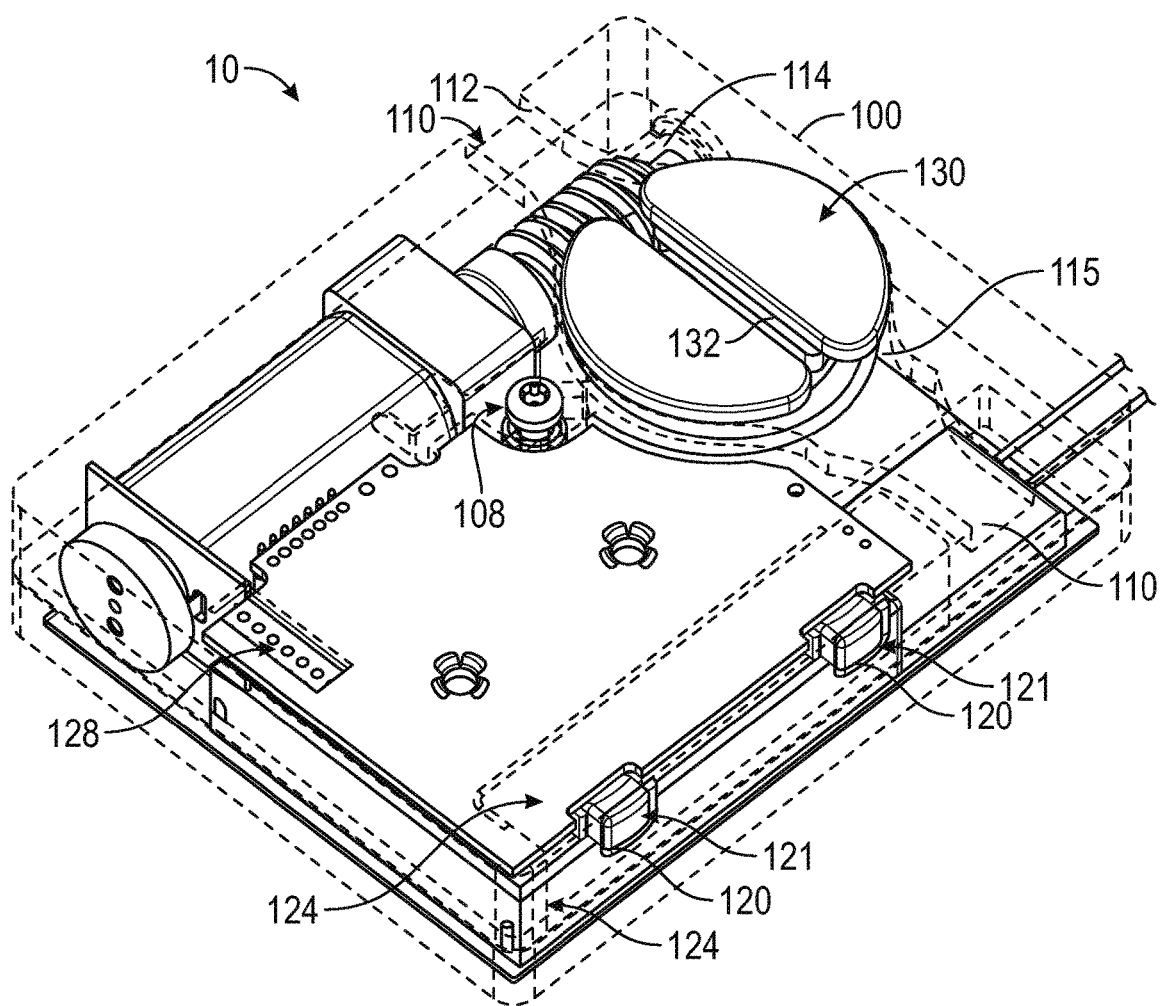
FIGS. 2A-2N are diagrams and drawings illustrating a motorized lacing engine, according to some example embodiments.
Figure 2B:
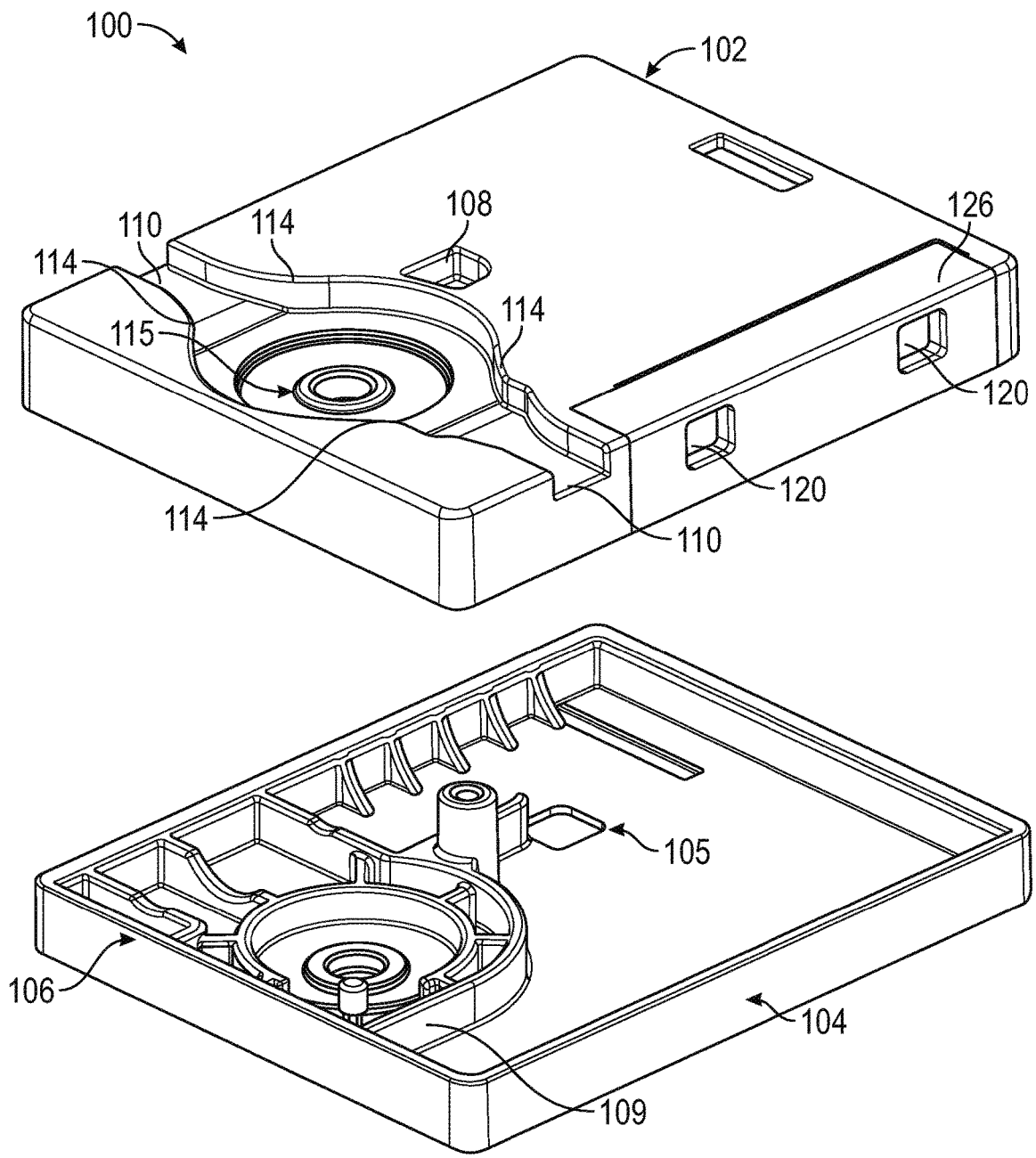
Figure 2C:
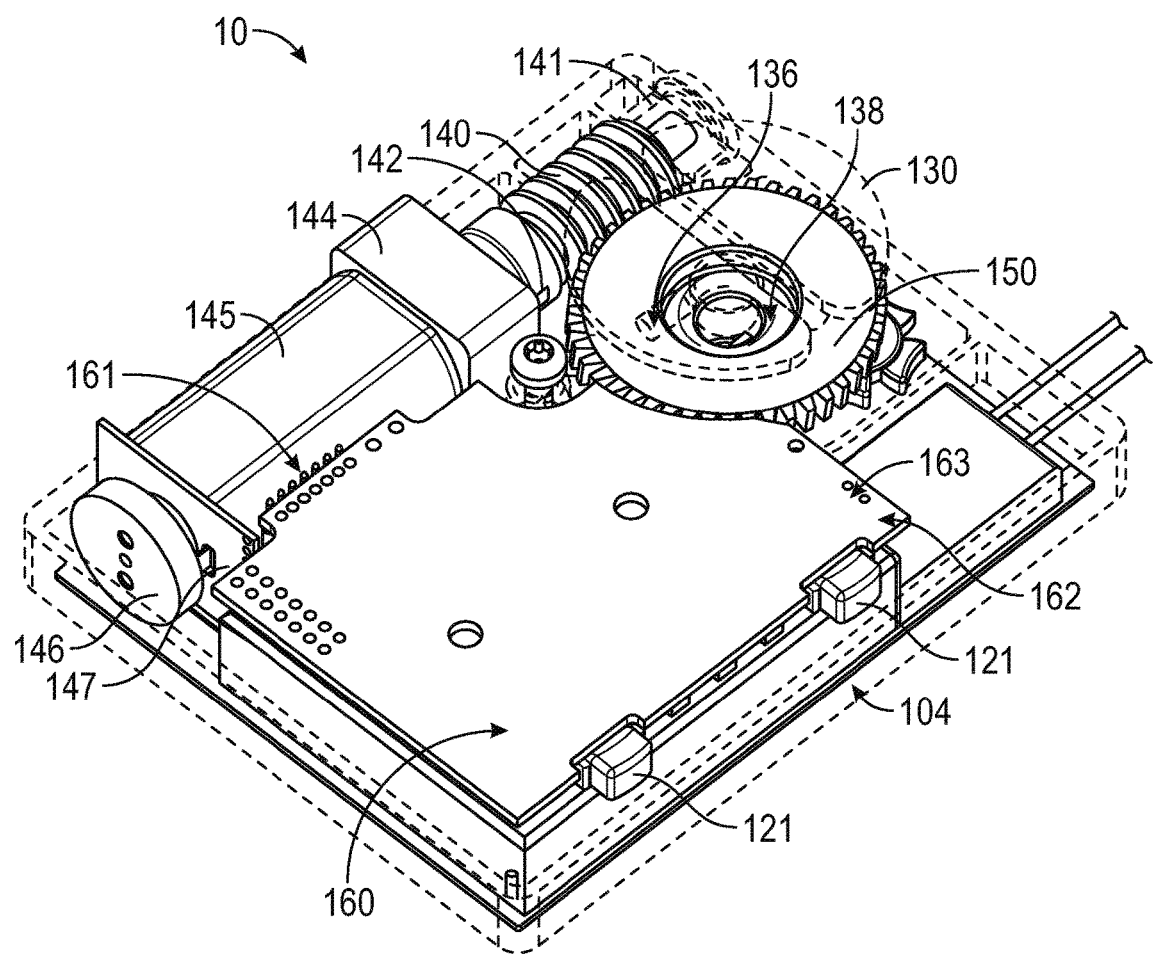
Figure 2D:
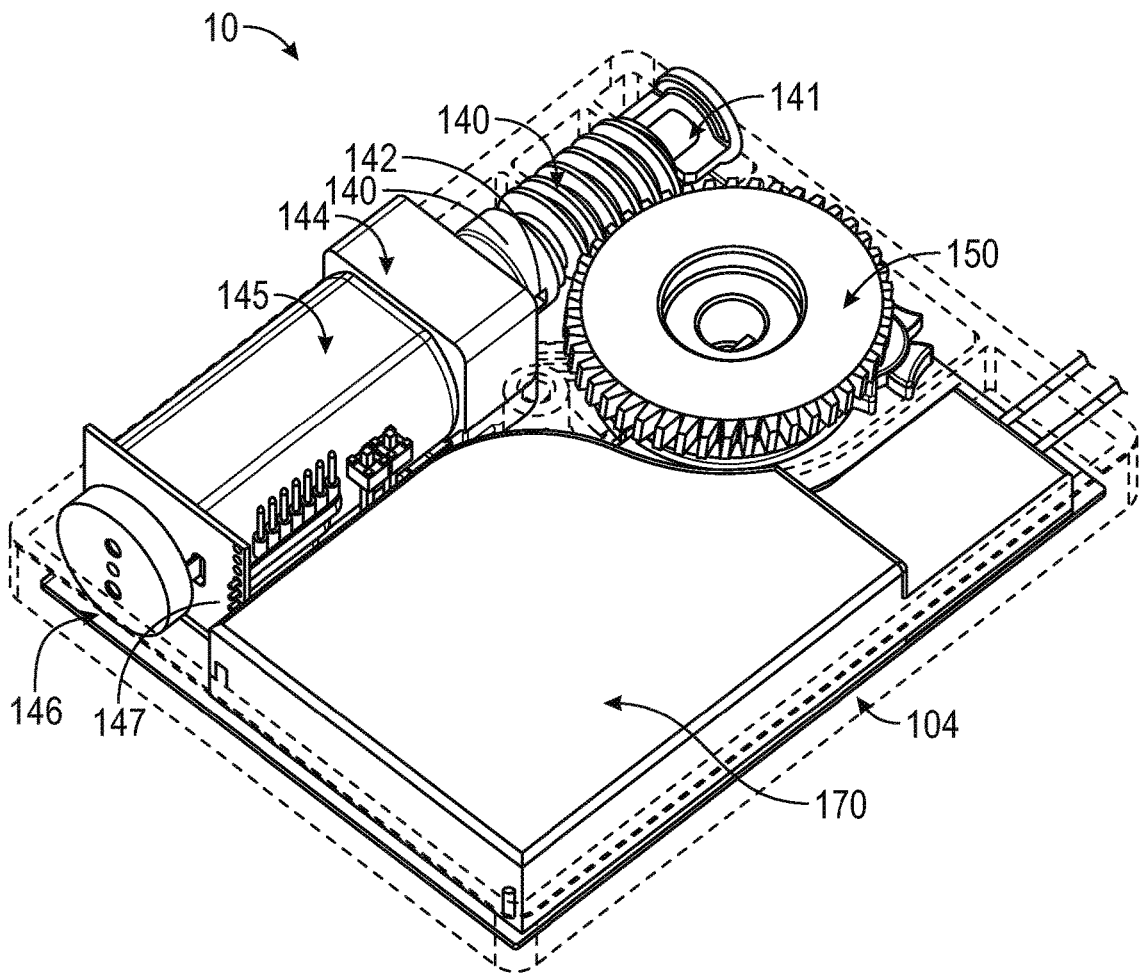
Figure 2E:
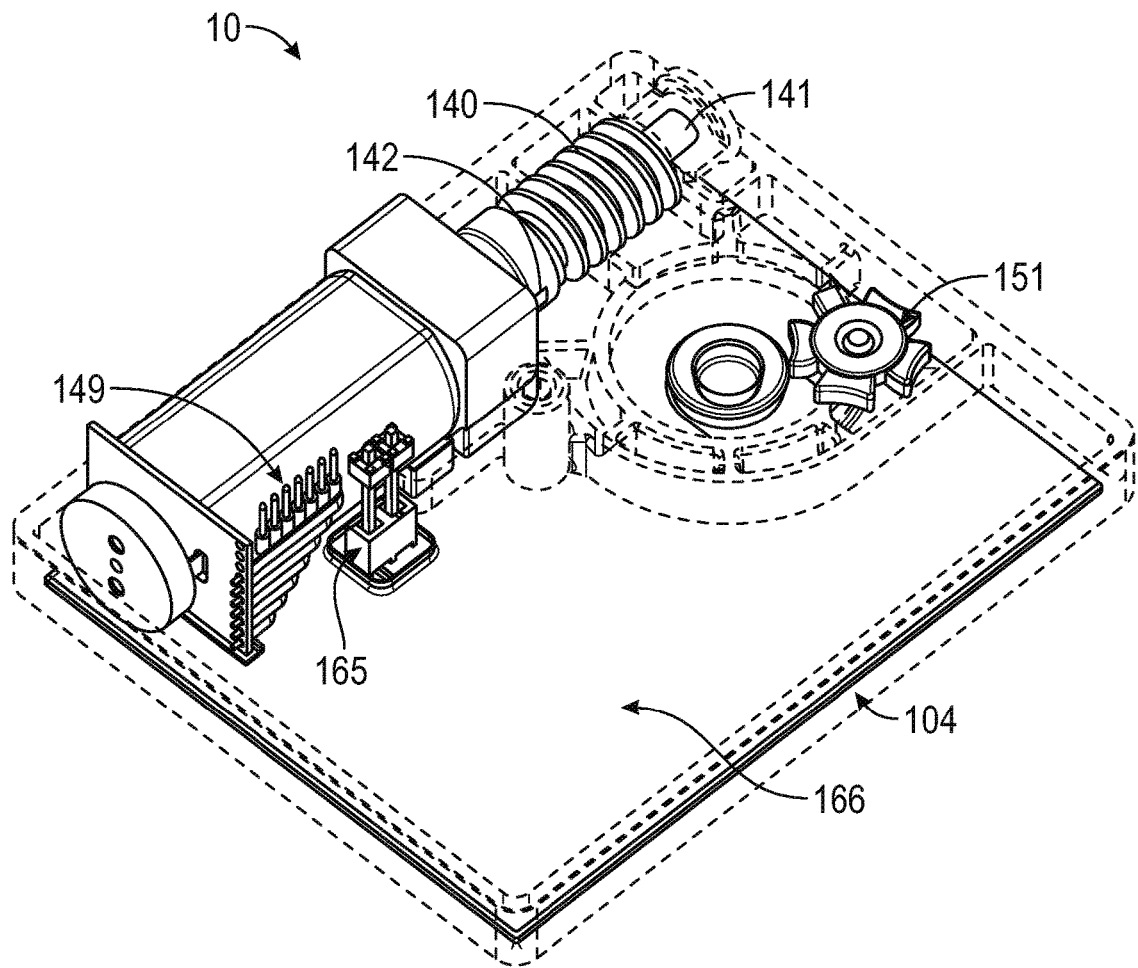
Figure 2F:
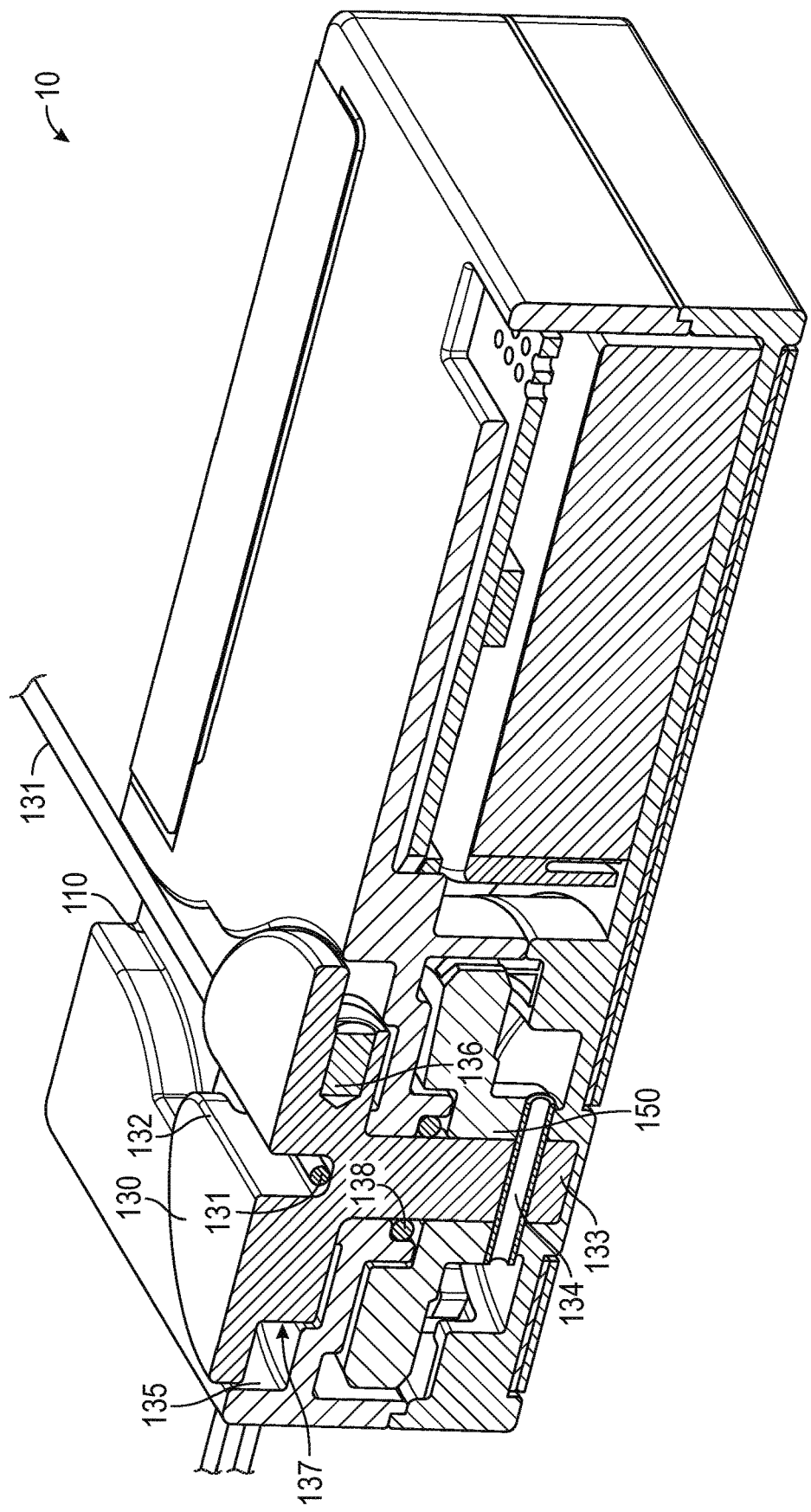
Figure 2G:
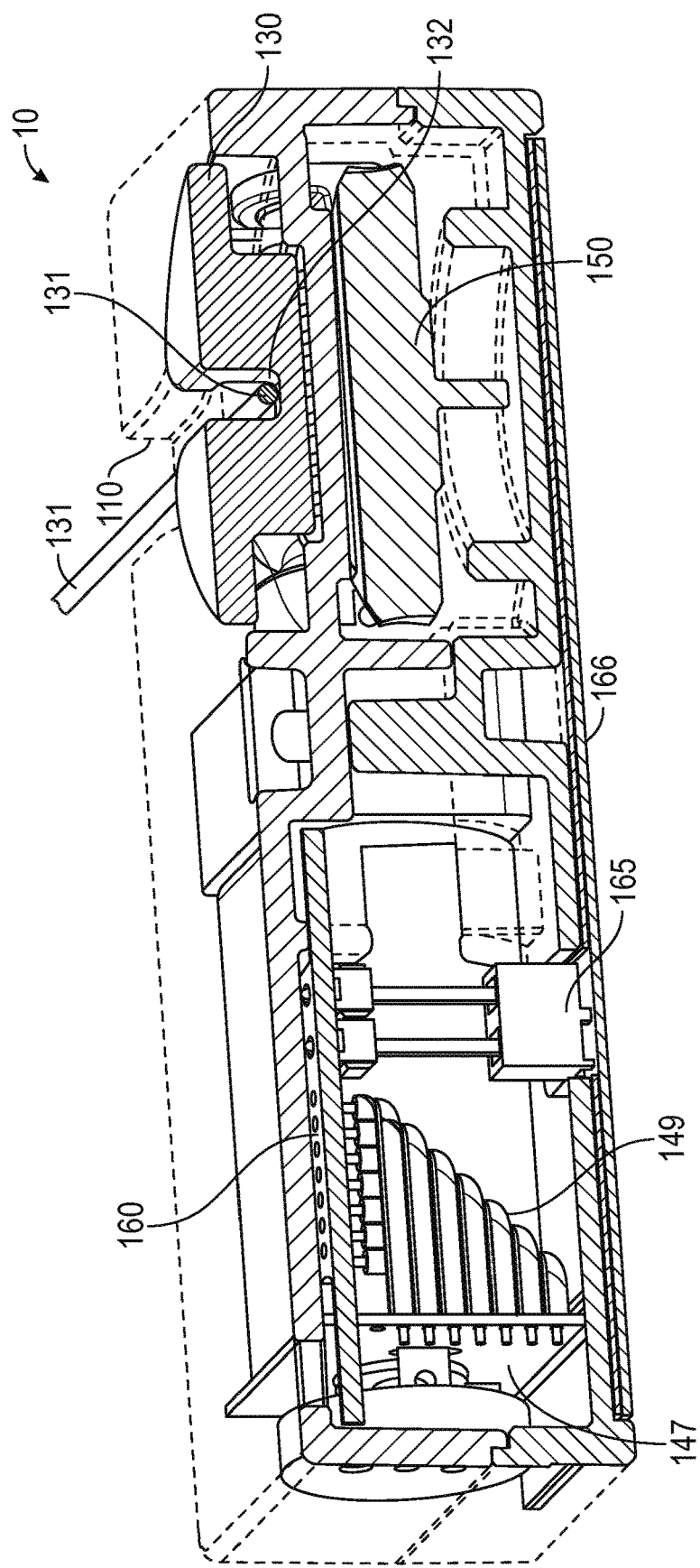
Figure 2H:
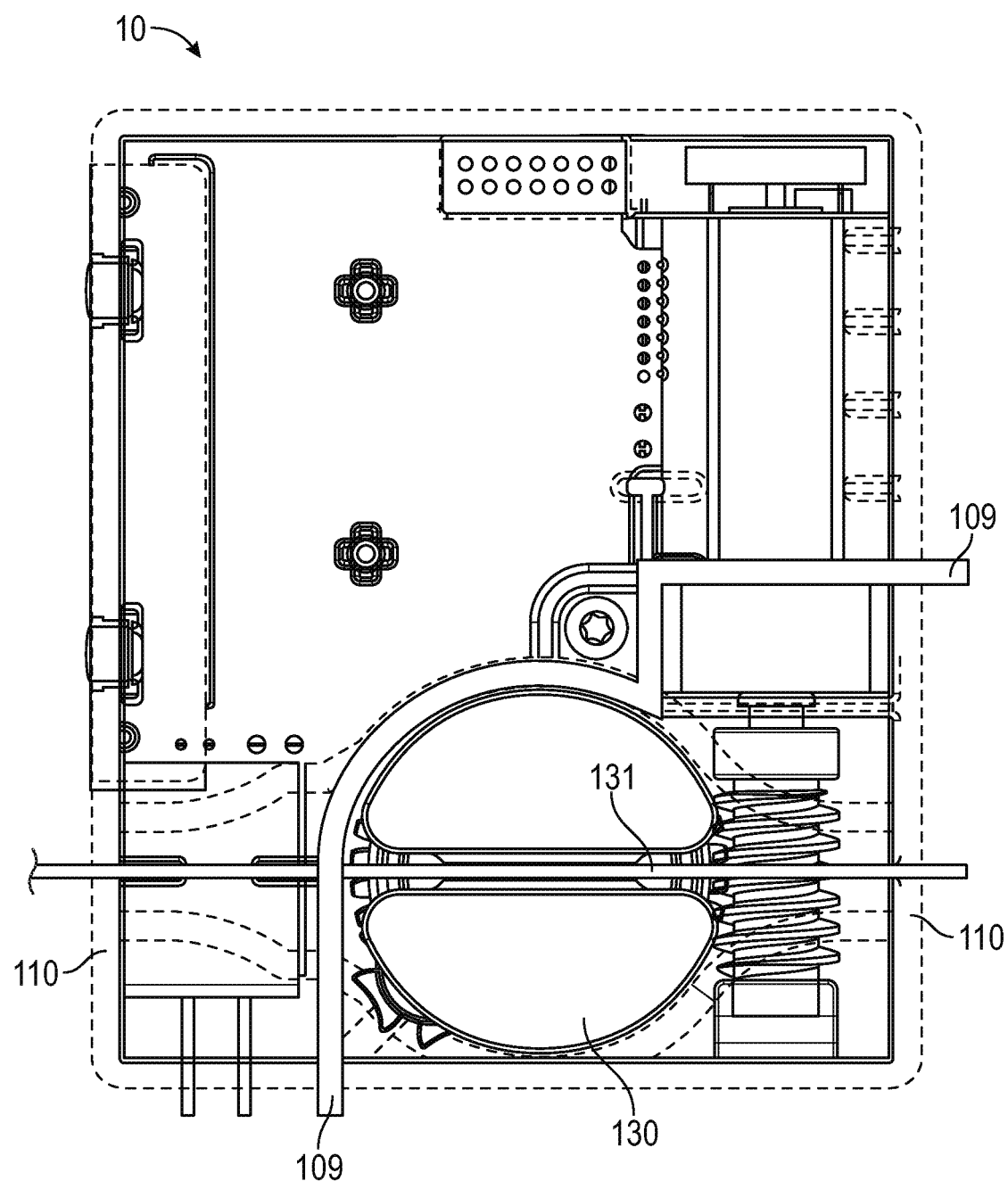
Figure 2I:
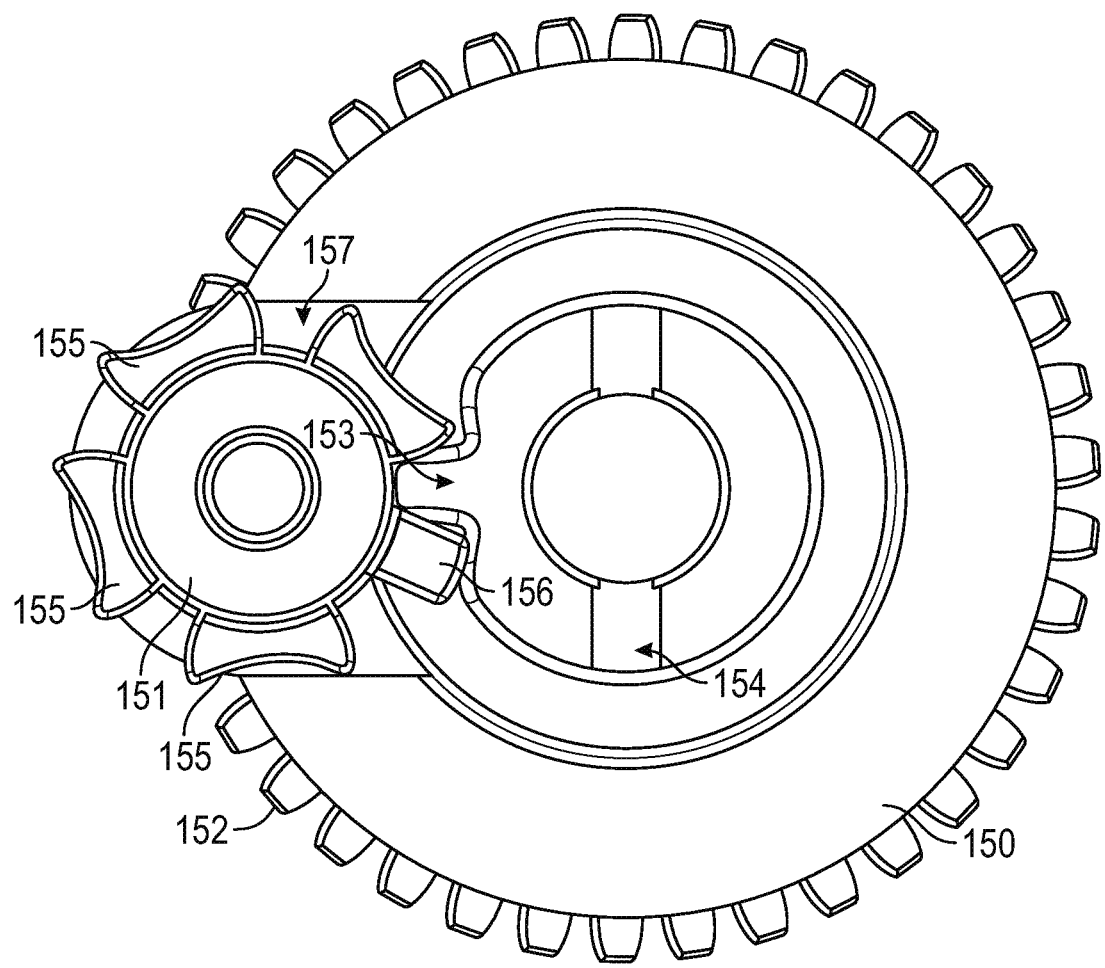
Figure 2J:
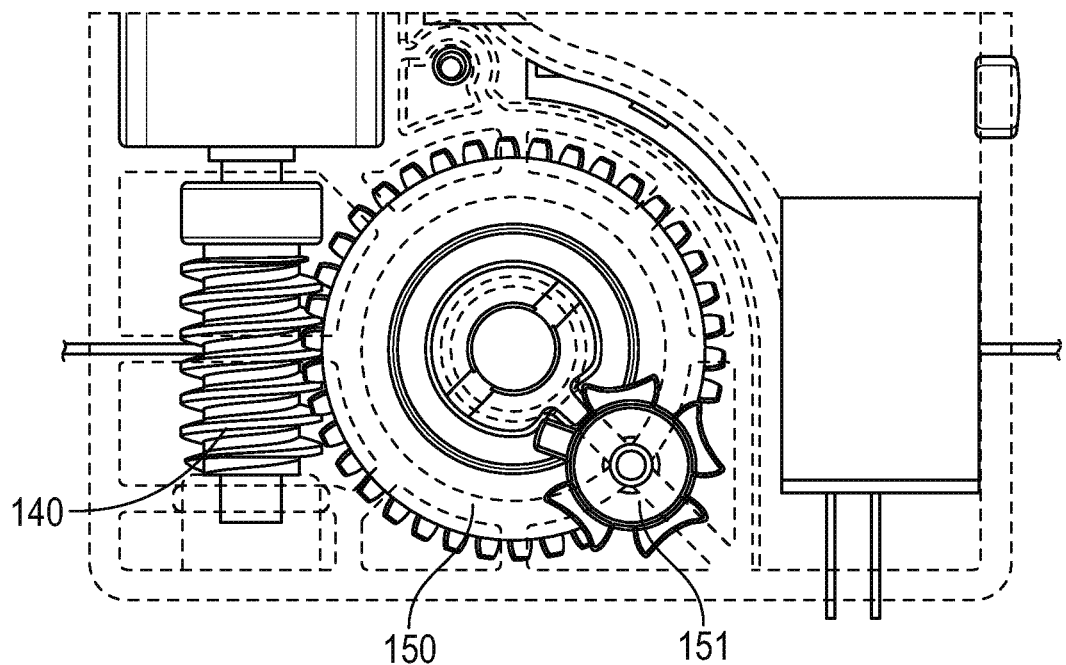
Figure 2K:
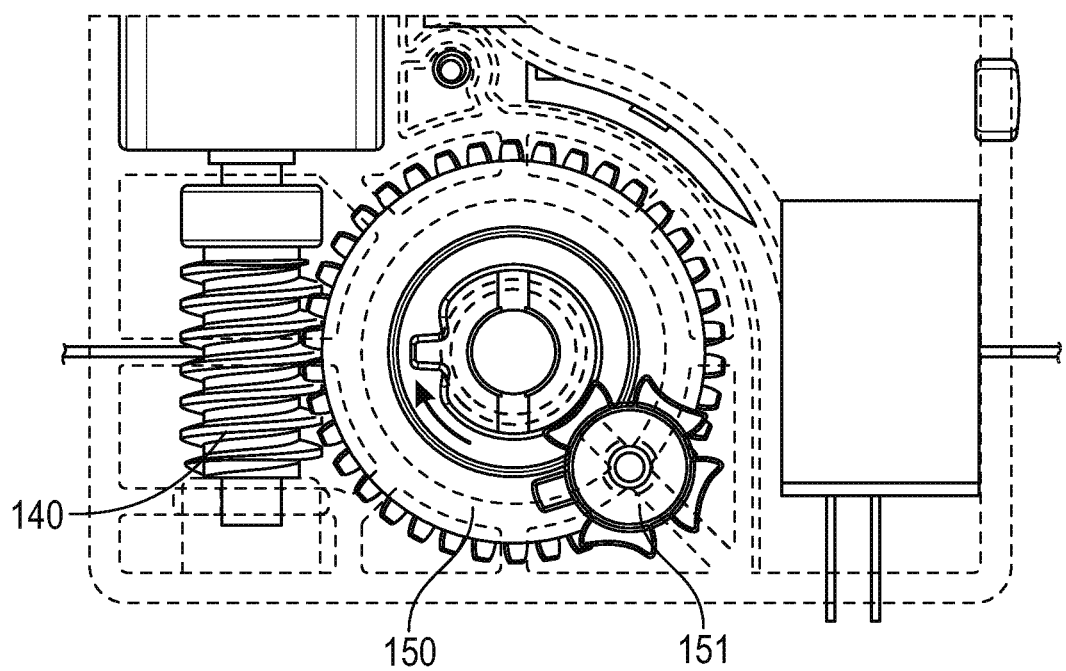
Figure 2L:
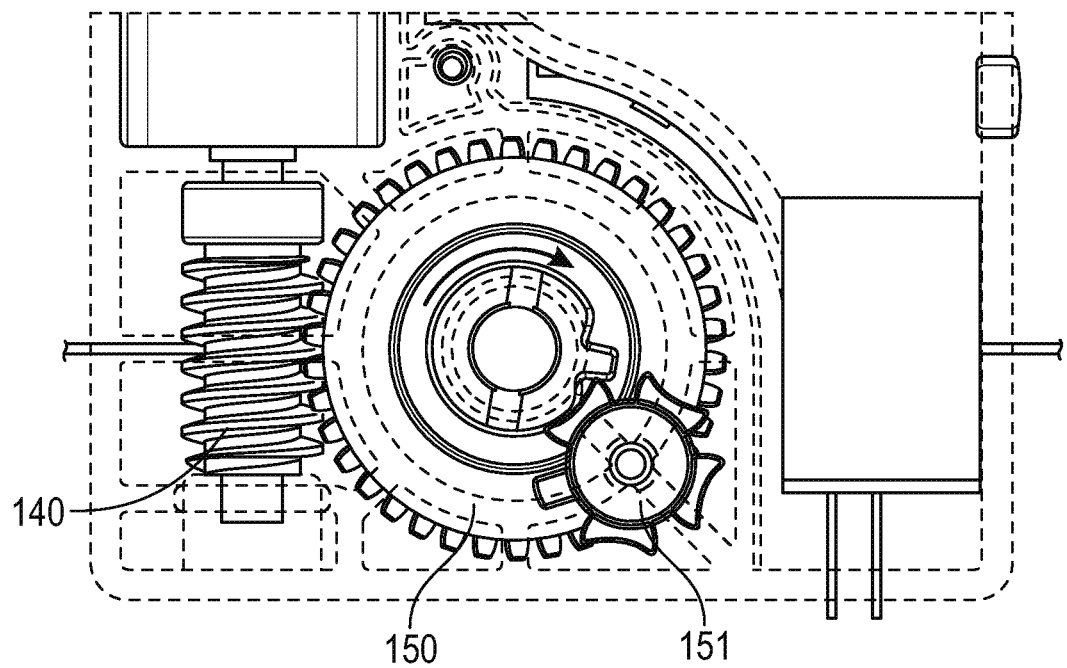
Figure 2M:
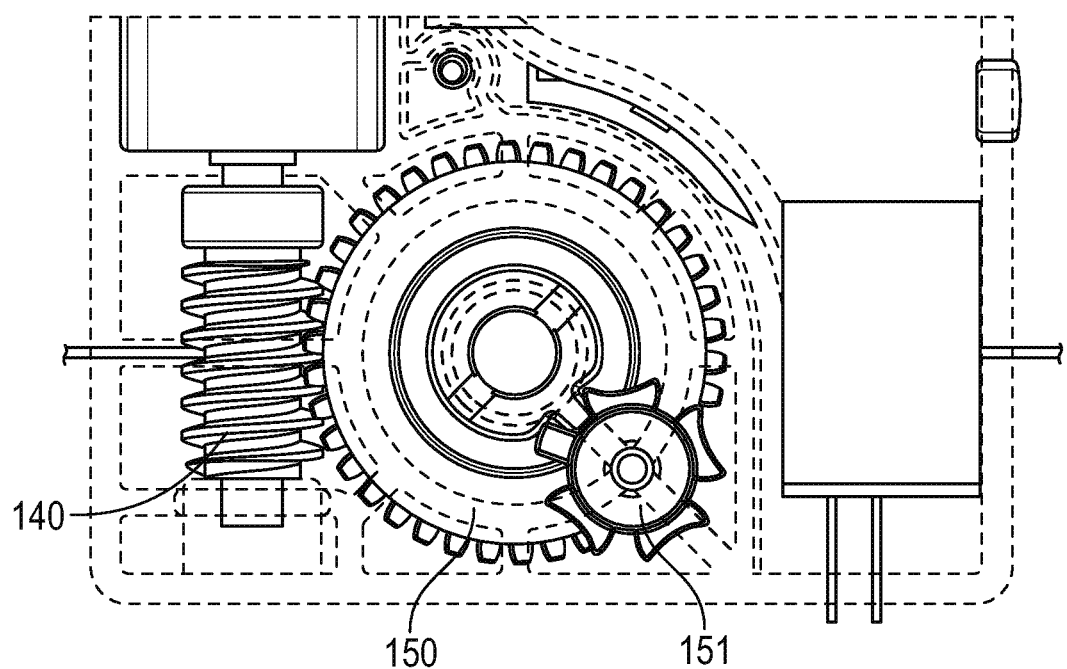
Figure 2N:
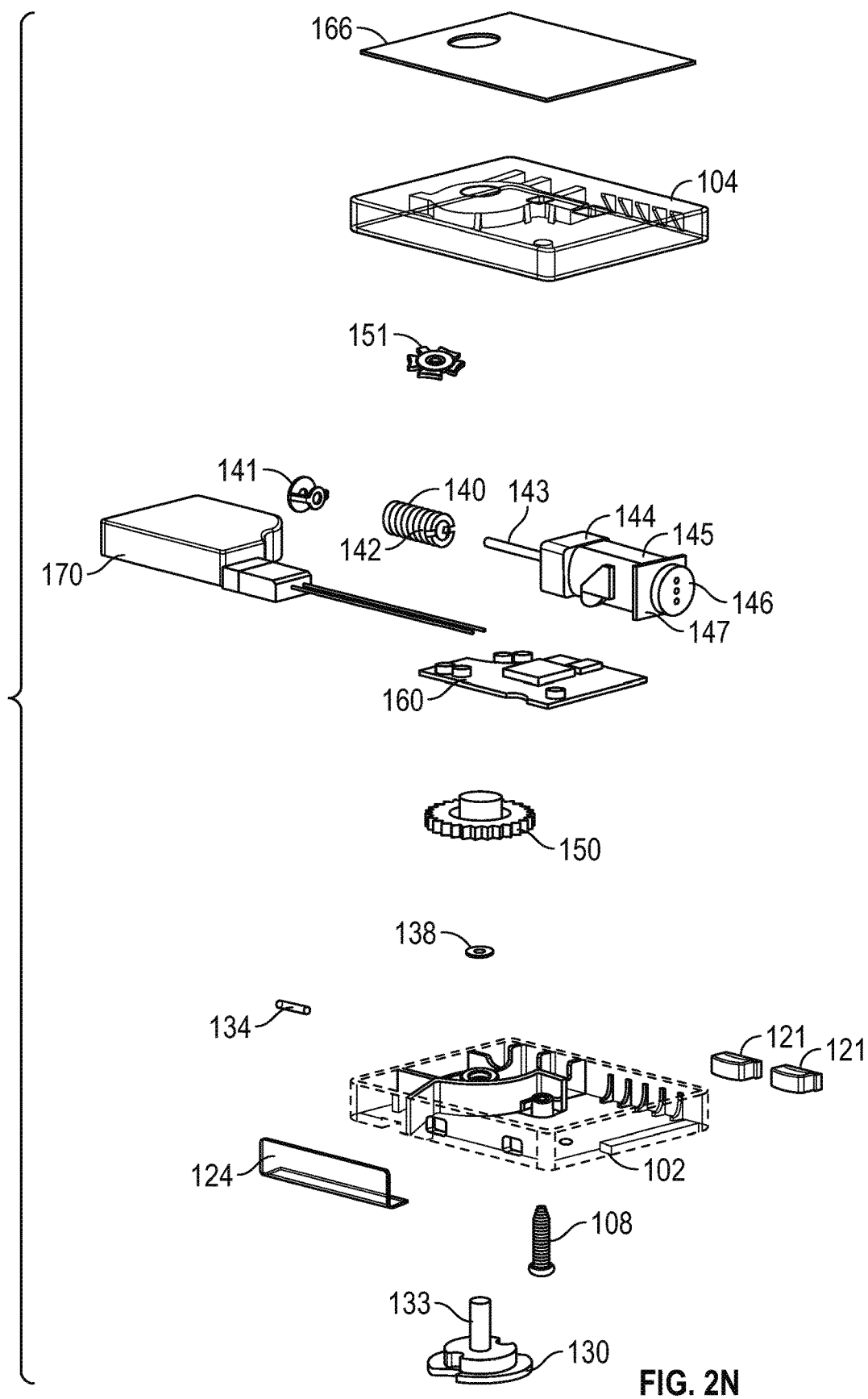

Examples of the lacing engine 10 are described in detail in reference to FIGS. 2A-2N. Various additional details of the motorized lacing system 1 are discussed throughout the remainder of the description.

FIGS. 2A-2N are diagrams and drawings illustrating a motorized lacing engine, according to some example embodiments. FIG. 2A introduces various external features of an example lacing engine 10, including a housing structure 100, case screw 108, lace channel 110 (also referred to as lace guide relief 110), lace channel wall 112, lace channel transition 114, spool recess 115, button openings 120, buttons 121, button membrane seal 124, programming header 128, spool 130, and lace grove 132. Additional details of the housing structure 100 are discussed below in reference to FIG. 2B.

In an example, the lacing engine 10 is held together by one or more screws, such as the case screw 108. The case screw 108 is positioned near the primary drive mechanisms to enhance structural integrity of the lacing engine 10. The case screw 108 also functions to assist the assembly process, such as holding the case together for ultra-sonic welding of exterior seams.

In this example, the lacing engine 10 includes a lace channel 110 to receive a lace or lace cable once assembled into the automated footwear platform. The lace channel 110 can include a lace channel wall 112. The lace channel wall 112 can include chamfered edges to provide a smooth guiding surface for a lace cable to run in during operation. Part of the smooth guiding surface of the lace channel 110 can include a channel transition 114, which is a widened portion of the lace channel 110 leading into the spool recess 115. The spool recess 115 transitions from the channel transition 114 into generally circular sections that conform closely to the profile of the spool 130. The spool recess 115 assists in retaining the spooled lace cable, as well as in retaining position of the spool 130. However, other aspects of the design provide primary retention of the spool 130. In this example, the spool 130 is shaped similarly to half of a yo-yo with a lace grove 132 running through a flat top surface and a spool shaft 133 (not shown in FIG. 2A) extending inferiorly from the opposite side. The spool 130 is described in further detail below in reference of additional figures.

The lateral side of the lacing engine 10 includes button openings 120 that enable buttons 121 for activation of the mechanism to extend through the housing structure 100. The buttons 121 provide an external interface for activation of switches 122, illustrated in additional figures discussed below. In some examples, the housing structure 100 includes button membrane seal 124 to provide protection from dirt and water. In this example, the button membrane seal 124 is up to a few mils (thousandth of an inch) thick clear plastic (or similar material) adhered from a superior surface of the housing structure 100 over a corner and down a lateral side. In another example, the button membrane seal 124 is a 2 mil thick vinyl adhesive backed membrane covering the buttons 121 and button openings 120.

FIG. 2B is an illustration of housing structure 100 including top section 102 and bottom section 104. In this example, the top section 102 includes features such as the case screw 108, lace channel 110, lace channel transition 114, spool recess 115, button openings 120, and button seal recess 126. The button seal recess 126 is a portion of the top section 102 relieved to provide an inset for the button membrane seal 124. In this example, the button seal recess 126 is a couple mil recessed portion on the lateral side of the superior surface of the top section 104 transitioning over a portion of the lateral edge of the superior surface and down the length of a portion of the lateral side of the top section 104.

In this example, the bottom section 104 includes features such as wireless charger access 105, joint 106, and grease isolation wall 109. Also illustrated, but not specifically identified, is the case screw base for receiving case screw 108 as well as various features within the grease isolation wall 109 for holding portions of a drive mechanism. The grease isolation wall 109 is designed to retain grease or similar compounds surrounding the drive mechanism away from the electrical components of the lacing engine 10 including the gear motor and enclosed gear box. In this example, the worm gear 150 and worm drive 140 are contained within the grease isolation wall 109, while other drive components such as gear box 144 and gear motor 145 are outside the grease isolation wall 109. Positioning of the various components can be understood through a comparison of FIG. 2B with FIG. 2C, for example.

FIG. 2C is an illustration of various internal components of lacing engine 10, according to example embodiments. In this example, the lacing engine 10 further includes spool magnet 136, O-ring seal 138, worm drive 140, bushing 141, worm drive key 142, gear box 144, gear motor 145, motor encoder 146, motor circuit board 147, worm gear 150, circuit board 160, motor header 161, battery connection 162, and wired charging header 163. The spool magnet 136 assists in tracking movement of the spool 130 though detection by a magnetometer (not shown in FIG. 2C). The o-ring seal 138 functions to seal out dirt and moisture that could migrate into the lacing engine 10 around the spool shaft 133.

In this example, major drive components of the lacing engine 10 include worm drive 140, worm gear 150, gear motor 145 and gear box 144. The worm gear 150 is designed to inhibit back driving of worm drive 140 and gear motor 145, which means the major input forces coming in from the lacing cable via the spool 130 are resolved on the comparatively large worm gear and worm drive teeth. This arrangement protects the gear box 144 from needing to include gears of sufficient strength to withstand both the dynamic loading from active use of the footwear platform or tightening loading from tightening the lacing system. The worm drive 140 includes additional features to assist in protecting the more fragile portions of the drive system, such as the worm drive key 142. In this example, the worm drive key 142 is a radial slot in the motor end of the worm drive 140 that interfaces with a pin through the drive shaft coming out of the gear box 144. This arrangement prevents the worm drive 140 from imparting any axial forces on the gear box 144 or gear motor 145 by allowing the worm drive 140 to move freely in an axial direction (away from the gear box 144) transferring those axial loads onto bushing 141 and the housing structure 100.

FIG. 2D is an illustration depicting additional internal components of the lacing engine 10. In this example, the lacing engine 10 includes drive components such as worm drive 140, bushing 141, gear box 144, gear motor 145, motor encoder 146, motor circuit board 147 and worm gear 150. FIG. 2D adds illustration of battery 170 as well as a better view of some of the drive components discussed above.

FIG. 2E is another illustration depicting internal components of the lacing engine 10. In FIG. 2E the worm gear 150 is removed to better illustrate the indexing wheel 151 (also referred to as the Geneva wheel 151). The indexing wheel 151, as described in further detail below, provides a mechanism to home the drive mechanism in case of electrical or mechanical failure and loss of position. In this example, the lacing engine 10 also includes a wireless charging interconnect 165 and a wireless charging coil 166, which are located inferior to the battery 170 (which is not shown in this figure). In this example, the wireless charging coil 166 is mounted on an external inferior surface of the bottom section 104 of the lacing engine 10.

FIG. 2F is a cross-section illustration of the lacing engine 10, according to example embodiments. FIG. 2F assists in illustrating the structure of the spool 130 as well as how the lace grove 132 and lace channel 110 interface with lace cable 131. As shown in this example, lace 131 runs continuously through the lace channel 110 and into the lace grove 132 of the spool 130. The cross-section illustration also depicts lace recess 135 and spool mid-section, which are where the lace 131 will build up as it is taken up by rotation of the spool 130. The spool mid-section 137 is a circular reduced diameter section disposed inferiorly to the superior surface of the spool 130. The lace recess 135 is formed by a superior portion of the spool 130 that extends radially to substantially fill the spool recess 115, the sides and floor of the spool recess 115, and the spool mid-section 137. In some examples, the superior portion of the spool 130 can extend beyond the spool recess 115. In other examples, the spool 130 fits entirely within the spool recess 115, with the superior radial portion extending to the sidewalls of the spool recess 115, but allowing the spool 130 to freely rotation with the spool recess 115. The lace 131 is captured by the lace groove 132 as it runs across the lacing engine 10, so that when the spool 130 is turned, the lace 131 is rotated onto a body of the spool 130 within the lace recess 135.

As illustrated by the cross-section of lacing engine 10, the spool 130 includes a spool shaft 133 that couples with worm gear 150 after running through an O-ring 138. In this example, the spool shaft 133 is coupled to the worm gear via keyed connection pin 134. In some examples, the keyed connection pin 134 only extends from the spool shaft 133 in one axial direction, and is contacted by a key on the worm gear in such a way as to allow for an almost complete revolution of the worm gear 150 before the keyed connection pin 134 is contacted when the direction of worm gear 150 is reversed. A clutch system could also be implemented to couple the spool 130 to the worm gear 150. In such an example, the clutch mechanism could be deactivated to allow the spool 130 to run free upon de-lacing (loosening). In the example of the keyed connection pin 134 only extending is one axial direction from the spool shaft 133, the spool is allowed to move freely upon initial activation of a de-lacing process, while the worm gear 150 is driven backward. Allowing the spool 130 to move freely during the initial portion of a de-lacing process assists in preventing tangles in the lace 131 as it provides time for the user to begin loosening the footwear, which in turn will tension the lace 131 in the loosening direction prior to being driven by the worm gear 150.

FIG. 2G is another cross-section illustration of the lacing engine 10, according to example embodiments. FIG. 2G illustrates a more medial cross-section of the lacing engine 10, as compared to FIG. 2F, which illustrates additional components such as circuit board 160, wireless charging interconnect 165, and wireless charging coil 166. FIG. 2G is also used to depict additional detail surround the spool 130 and lace 131 interface.

FIG. 2H is a top view of the lacing engine 10, according to example embodiments. FIG. 2H emphasizes the grease isolation wall 109 and illustrates how the grease isolation wall 109 surrounds certain portions of the drive mechanism, including spool 130, worm gear 150, worm drive 140, and gear box 145. In certain examples, the grease isolation wall 109 separates worm drive 140 from gear box 145. FIG. 2H also provides a top view of the interface between spool 130 and lace cable 131, with the lace cable 131 running in a medial-lateral direction through lace groove 132 in spool 130.

FIG. 2I is a top view illustration of the worm gear 150 and index wheel 151 portions of lacing engine 10, according to example embodiments. The index wheel 151 is a variation on the well-known Geneva wheel used in watchmaking and film projectors. A typical Geneva wheel or drive mechanism provides a method of translating continuous rotational movement into intermittent motion, such as is needed in a film projector or to make the second hand of a watch move intermittently. Watchmakers used a different type of Geneva wheel to prevent over-winding of a mechanical watch spring, by using a Geneva wheel with a missing slot (e.g., one of the Geneva slots 157 would be missing). The missing slot would prevent further indexing of the Geneva wheel, which was responsible for winding the spring and prevents over-winding. In the illustrated example, the lacing engine 10 includes a variation on the Geneva wheel, indexing wheel 151, which includes a small stop tooth 156 that acts as a stopping mechanism in a homing operation. As illustrated in FIGS. 2J-2M, the standard Geneva teeth 155 simply index for each rotation of the worm gear 150 when the index tooth 152 engages the Geneva slot 157 next to one of the Geneva teeth 155. However, when the index tooth 152 engages the Geneva slot 157 next to the stop tooth 156 a larger force is generated, which can be used to stall the drive mechanism in a homing operation. Alternatively, the larger force and different force profile generated when the index tooth 152 engages the stop tooth 156 can be detected by a processor circuit within the lacing engine to identify a home position. The side profile of the stop tooth 156 is steeper and generally straight (as compared to the Geneva teeth 155 side profile). The stop tooth 156 can be used to create a known location of the mechanism for homing in case of loss of other positioning information, such as the motor encoder 146.

In this example, the homing apparatus (indexing wheel 151) is designed to allow for four complete revolutions between home positions (other designs can be implemented to achieve different numbers of revolutions). The homing apparatus has two home positions, one that represents a completely loose state (all lace unwound from the spool) and a second one that represents a completely tight state (as much lace is the system can wind onto the spool). When the homing apparatus hits either home position the interaction between the index tooth 152 and the stop tooth 156 generates a large enough force to stall the drive mechanism. The system can measure the force through a measurement of motor current. Measuring motor current over time can result in generation of a force profile, which can be used to identify the home positions. The force profile associated with the index tooth 152 engaging the stop tooth 156 is sufficiently different than the force profile generated by the index tooth 152 engaging one of the Geneva teeth 155, that the processor can identify the difference. In an example, the force profile generated by hitting the stop tooth has a larger magnitude and a fast rate of change (e.g., higher slope) over time. The force profile generated by the engagement of the stop tooth is also designed to be distinguishable from force profiles generated from pulls on the lace cable, which can be transmitted through the spool into the drive mechanism. Force profiles generated by forces transmitted through the lace cable will generally be lower in magnitude and the rate of change will be slower (e.g., a lower slope) over time.

FIG. 2J-2M are illustrations of the worm gear 150 and index wheel 151 moving through an index operation, according to example embodiments. As discussed above, these figures illustrate what happens during a single full revolution of the worm gear 150 starting with FIG. 2J though FIG. 2M. In FIG. 2J, the index tooth 153 of the worm gear 150 is engaged in the Geneva slot 157 between a first Geneva tooth 155a of the Geneva teeth 155 and the stop tooth 156. FIG. 2K illustrates the index wheel 151 in a first index position, which is maintained as the index tooth 153 starts its revolution with the worm gear 150. In FIG. 2L, the index tooth 153 begins to engage the Geneva slot 157 on the opposite side of the first Geneva tooth 155a. Finally, in FIG. 2M the index tooth 153 is fully engaged within a Geneva lot 157 between the first Geneva tooth 155a and a second Geneva tooth 155b. The process shown in FIGS. 2J-2M continues with each revolution of the worm gear 150 until the index tooth 153 engages the stop tooth 156. As discussed above, when the index tooth 153 engages the stop tooth 156, the increased forces can stall the drive mechanism.

FIG. 2N is an exploded view of lacing engine 10, according to example embodiments. The exploded view of the lacing engine 10 provides an illustration of how all the various components fit together. FIG. 2N shows the lacing engine 10 upside down, with the bottom section 104 at the top of the page and the top section 102 near the bottom. In this example, the wireless charging coil 166 is shown as being adhered to the outside (bottom) of the bottom section 104. The exploded view also provide a good illustration of how the worm drive 140 is assembled with the bushing 141, drive shaft 143, gear box 144 and gear motor 145. The illustration does not include a drive shaft pin that is received within the worm drive key 142 on a first end of the worm drive 140. As discussed above, the worm drive 140 slides over the drive shaft 143 to engage a drive shaft pin in the worm drive key 142, which is essentially a slot running transverse to the drive shaft 143 in a first end of the worm drive 140.

Figure 3:
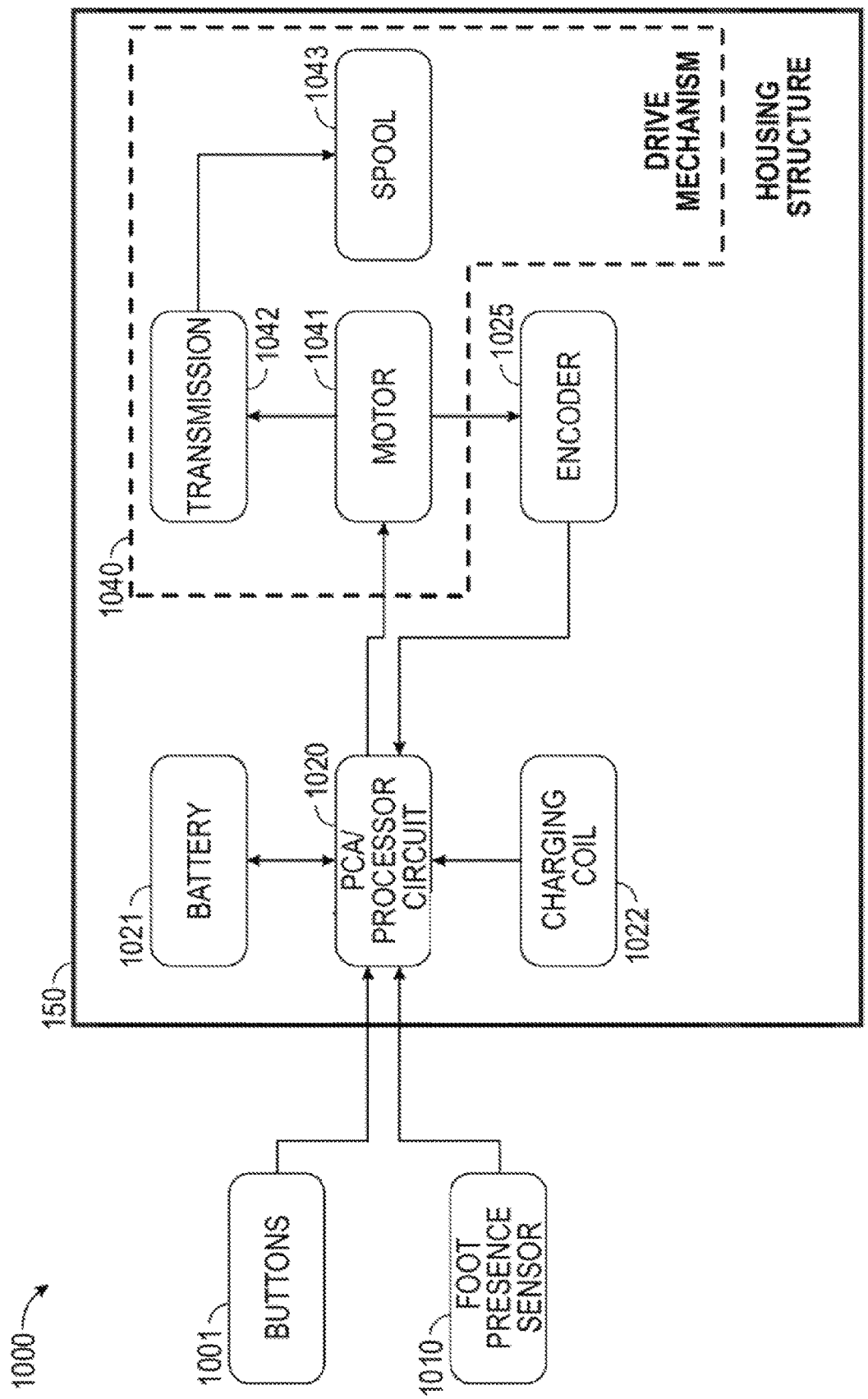
FIG. 3 is a block diagram illustrating components of a motorized lacing system, according to some example embodiments.

FIG. 3 is a block diagram illustrating components of a motorized lacing system 1000 for footwear, according to some example embodiments. The system 1000 illustrates basic components of a motorized lacing system such as including interface buttons 1001, optional foot presence sensor(s) 1010, a printed circuit board assembly (PCA) with a processor circuit 1020, a battery 1021, a charging coil 1022, an encoder 1025, a motor 1041, a transmission 1042, and a spool 1043. In this example, the interface buttons 1001 and foot presence sensor(s) 1010 can communicate with the circuit board (PCA) 1020, which also communicates with the battery 1021 and charging coil 1022. The encoder 1025 and motor 1041 are also connected to the circuit board 1020 and each other. The transmission 1042 couples the motor 1041 to the spool 1043 to form the drive mechanism 1040. In this example, the motor 1041, transmission 1042, and spool 1043 make up the drive mechanism 1040, which in some examples also includes the encoder 1025.

In an example, the processor circuit 1020 controls one or more aspects of the drive mechanism 1040. For example, the processor circuit 1020 can be configured to receive information from the buttons 1001 and/or from the foot presence sensor 1010 and/or from the battery 1021 and/or from the drive mechanism 1040 and/or from the encoder 1025, and can be further configured to issue commands to the drive mechanism 1040, such as to tighten or loosen the footwear, or to obtain or record sensor information, among other functions. As discussed further below, in some examples the processor circuit 1020 can measure voltage and current from the battery 1021. The processor circuit 1020 can also monitor signals from the encoder 1025. Information from the battery 1021 and encoder 1025 can be used by the processor circuit 1020 to control the drive mechanism 1040, in particular the motor 1041. In some examples, the processor circuit 1020 can also measure current draw from the motor 1041, which can be used as a measure of torque being developed by the motor 1041. As discussed further below, voltage can be measured by processor circuit 1020, and voltage can be used as a measure of motor speed (or they are directly related).

Motor Control Scheme

FIG. 4-9 are diagrams and flowcharts illustrating aspects of a motor control scheme for controlling a motorized lacing engine, according to some example embodiments. The motor control schemes discussed herein can control the operation of drive mechanism 1040 and more specifically motor 1041 (or motor 145 as illustrated in FIGS. 1-2N). The motor control schemes include concepts such as variable sized control segments (FIG. 4), motion profiles (FIGS. 5-7), and modification of motor control parameters based on battery voltage.

Figure 4:
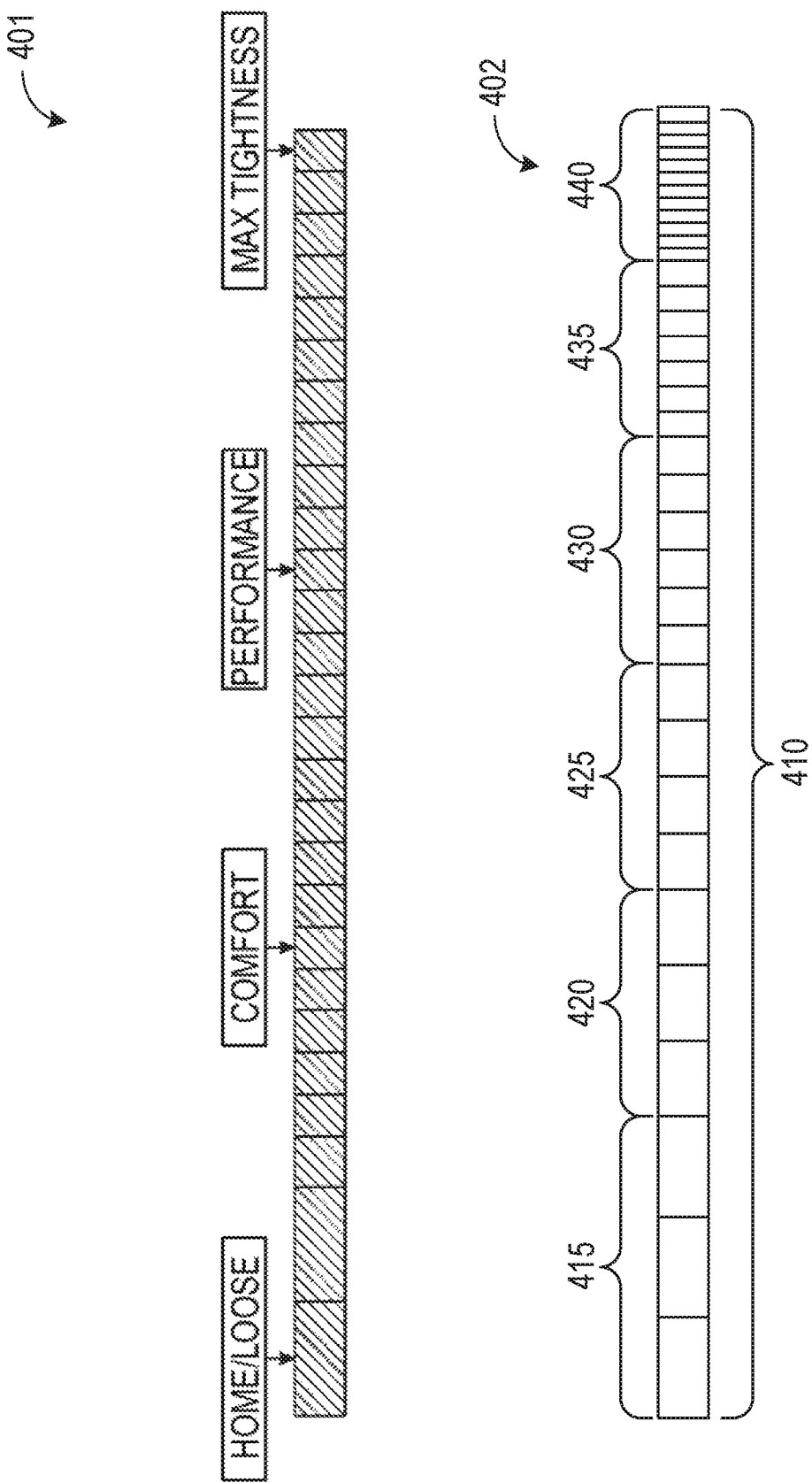

FIG. 4 includes diagrams illustrating the variable size control segments concept, according to an example embodiment. In this example, the variable segment size motor control scheme involves dividing up the total travel, in terms of lace take-up, into segments, with the segments varying in size based on position on a continuum of lace travel (e.g., between home/loose position on one end and max tightness on the other). As the motor is controlling a radial spool and will be controlled, primarily, via a radial encoder on the motor shaft, the segments can be sized in terms of degrees of spool travel (which can also be viewed in terms of encoder counts). On the loose side of the continuum, the segments can be larger, such as 10 degrees of spool travel, as the amount of lace movement is less critical. However, as the laces are tightened each increment of lace travel becomes more and more critical to obtain the desired amount of lace tightness. Other parameters, such as motor current, can be used as secondary measures of lace tightness or continuum position. FIG. 4 includes two separate illustrations of different segment sizes based on position along a tightness continuum.

In an example, the variable size control segments involve dividing up the total rotary travel of the drive mechanism into variable sized segments based on position within the continuum of travel. As discussed above, in certain examples, the drive mechanism 1040 can be configured to have a limited total operational travel. The total operation travel of the drive mechanism can be viewed in terms of rotations or in terms of a linear distance. When viewed in terms of a linear distance, the total operational travel can be viewed in terms of the amount of lace (or tensioning member) take-up the drive mechanism is capable of. The continuum of total operational travel of the drive mechanism can be viewed in terms of lace take-up going between a home (or fully loose) position to max tightness (e.g., 4 full revolutions of the spool 1043 as controlled by the mechanical stop mechanism discussed above). Movements of the drive mechanism 1040 on the loose side of the continuum can be much more dramatic (e.g., larger), while on the maximum tightness side the commanded movements need to have a much finer level of control, such as is illustrated by control segments 401. Accordingly, in an example, the movement continuum is divided into segments or groups with each unit within a segment or group representing a certain move size (e.g., degrees of rotation, encoder counts, or linear distance). On the loose side of the continuum, the unit size can be large or command a bigger rotational movement of the drive mechanism 1040. On the tight side of the continuum, the units can be much smaller to command a small rotational movement of the drive mechanism 1040.

In an example, the variable control segments 402 can include a continuum of travel 410, which can be broken into six control segments 415, 420, 425, 430, 435, 440. The continuum of travel 410 can go from detangling segments 415 to max tightness segments 440, with homing segment 420, comfort segments 425, performance segments 430, and high performance segments 435 in between. As illustrated by the different lateral distances of the blocks illustrating the different control segments within the variable control segments 402, each different segment unit can command the drive mechanism 1040 to move a different amount. The segment units can be defined in terms of degrees of rotation of the spool, or in terms of linear travel distance of a lace.

The motion profile concept involves grouping one or move movements of the drive mechanism into a profile to command a certain desired outcome. Each motion profile will include parameters to control drive mechanism 1010 movement. In an example, the parameters are viewed in terms of controlling spool 1009 movement. The motion profiles can be generated from a table of movements. The motion profiles can be modified by additional global parameters, such as gear reduction multipliers and/or scaling factors associated with battery voltage. For example, the motion control techniques discussed below in reference to FIGS. 8 and 9, can modify a scaling factor that will subsequently be used to modify the motion profiles.

FIG. 5 illustrates using a tightness continuum position to build a table of motion profiles based on current tightness continuum position and desired end position. The motion profiles can then be translated into specific inputs from user input buttons. In this example, the motion profiles include parameters of spool motion, such as acceleration (Accel (deg/s/s)), velocity (Vel (deg/s)), deceleration (Dec (deg/s/s)), and angle of movement (Angle (deg)). In some examples, the movement parameters can be alternatively expressed in terms of lace movement acceleration, velocity, deceleration and linear distance.

Figure 6:
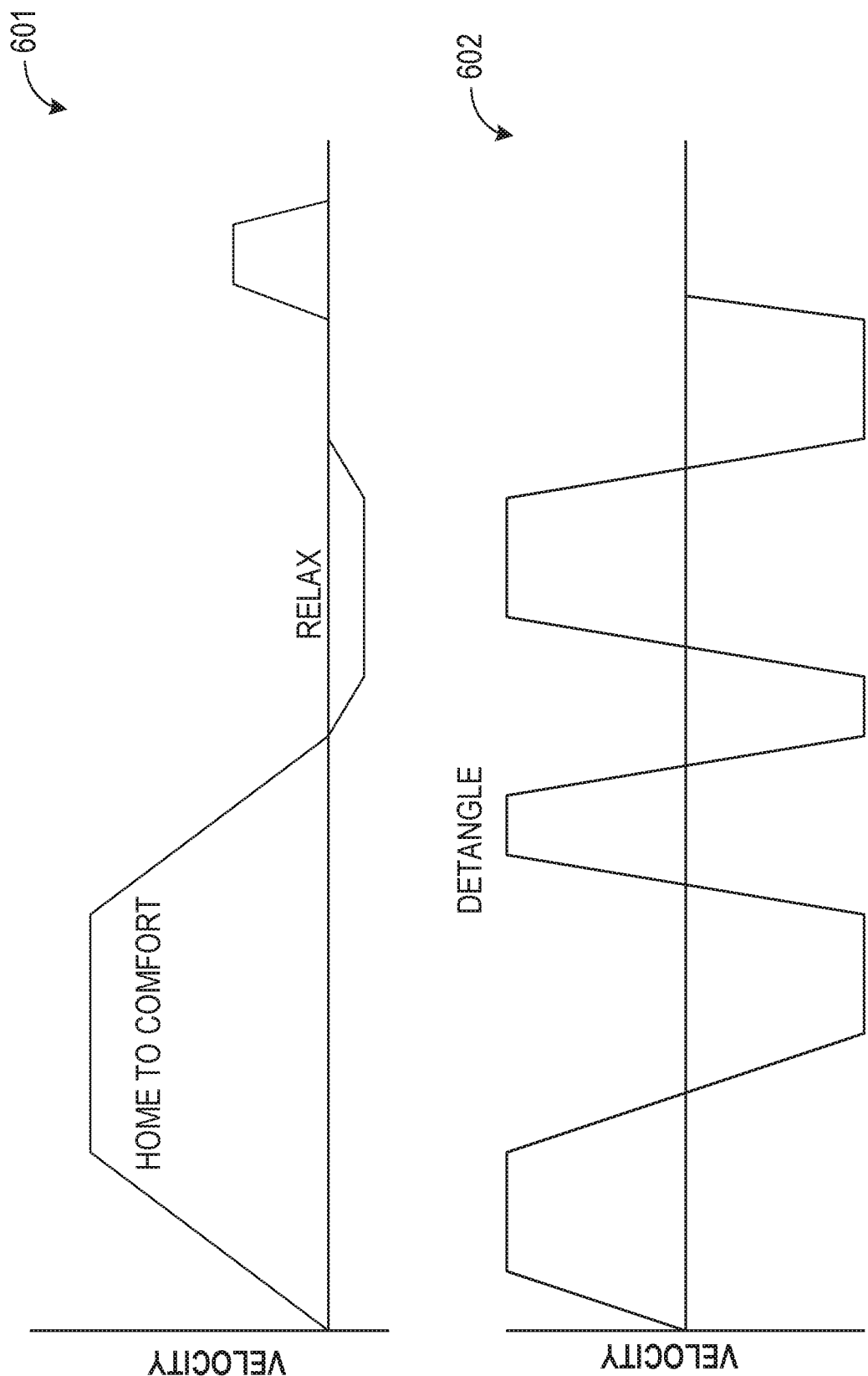

FIG. 6 depicts example motion profiles plotted on a velocity over time graph. Graph 601 illustrates velocity of time profiles for different motion profiles, such as a home-to-comfort profile and a relax profile. The graph 602 illustrates a detangle movement profile, where the system is tightened and loosened in rapid succession to work on eliminating a tangle within the drive mechanism 1040 (e.g., where the lace gets tangled in the spool 1043.

Figure 7:
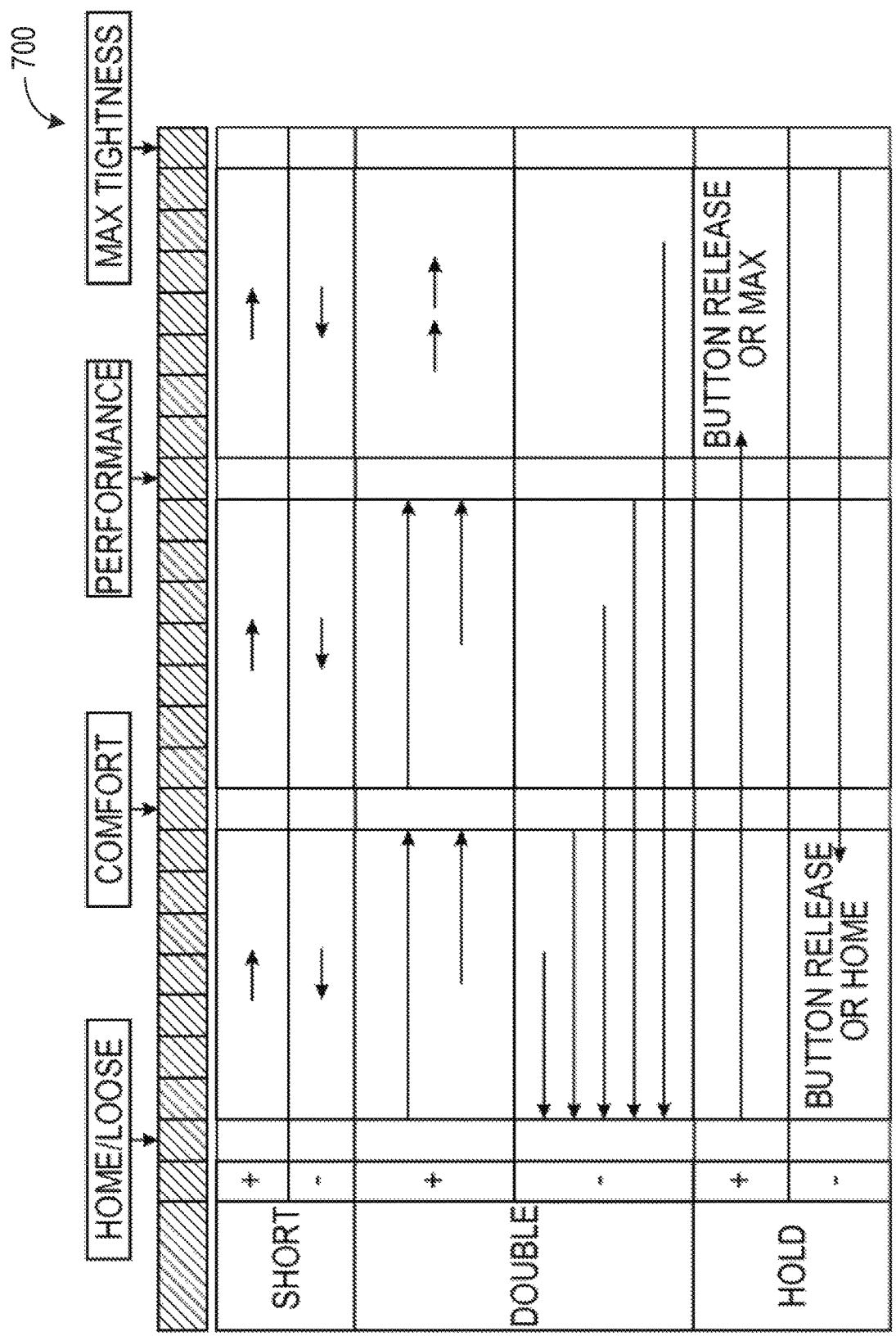

FIG. 7 is a graphic illustrating example user inputs to activate various motion profiles along the tightness continuum. For example, a short button activation on the plus actuator can be programmed to move to progressively tighter position along the continuum, such as from Home/Loose to Comfort. Conversely, a short button activation on the negative actuator can be programmed to move to progressively looser position, such as from Performance to Comfort. A double press of individual buttons can activate different profiles. For example, a double press on the plus actuator can be programmed to more rapidly move to the next progressively tighter position on the continuum, such as from Performance to Max Tightness. While a double press on the negative actuator can be programmed to transition all the way back to Home/Loose position, regardless of starting position. Holding an actuator button can be programmed to tighten (plus actuator) or loosen (negative actuator) until released or a stop is reached (e.g., Max Tightness or Home/Loose).

Figure 8:
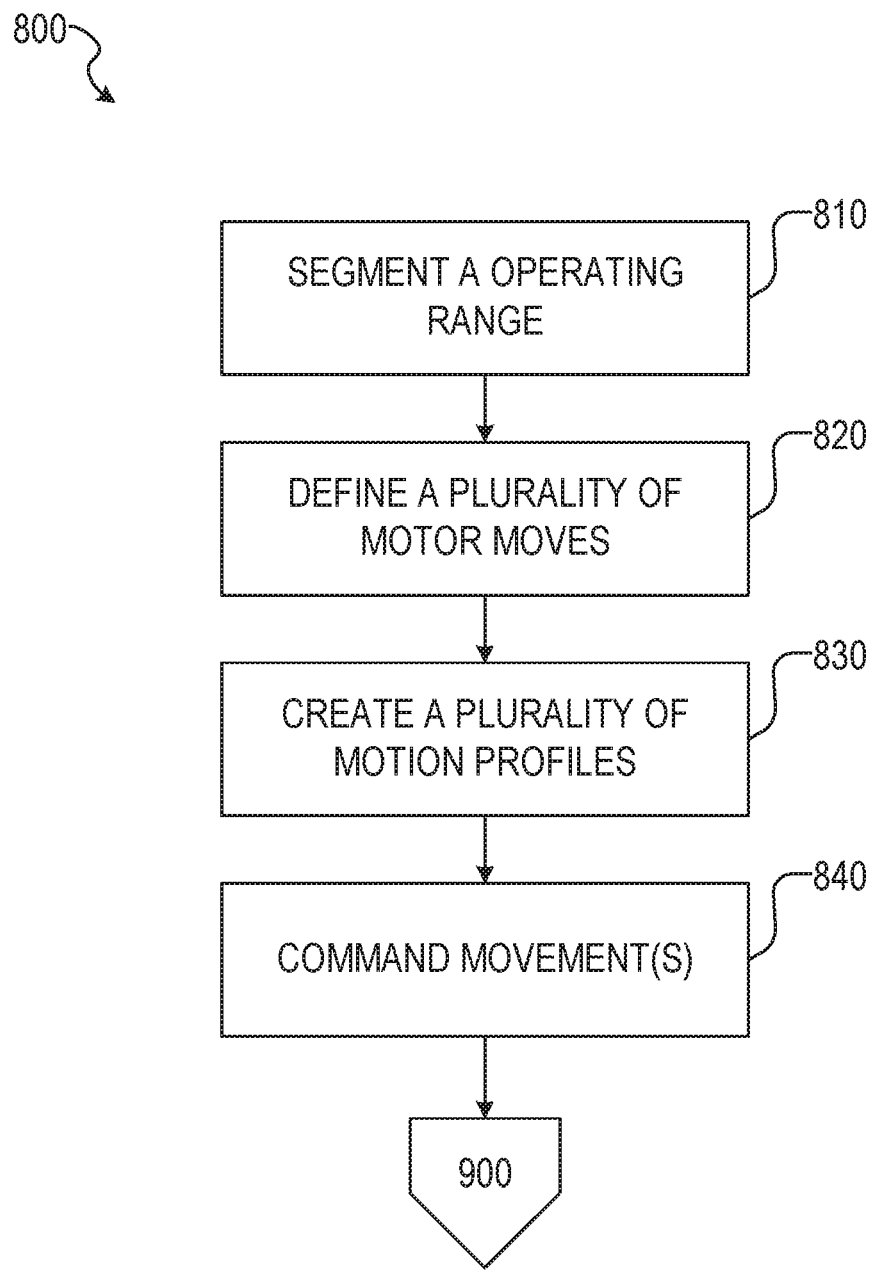
FIGS. 8-9 are flowcharts illustrating motor control techniques for an automated footwear platform, according got some example embodiments.
Figure 9:
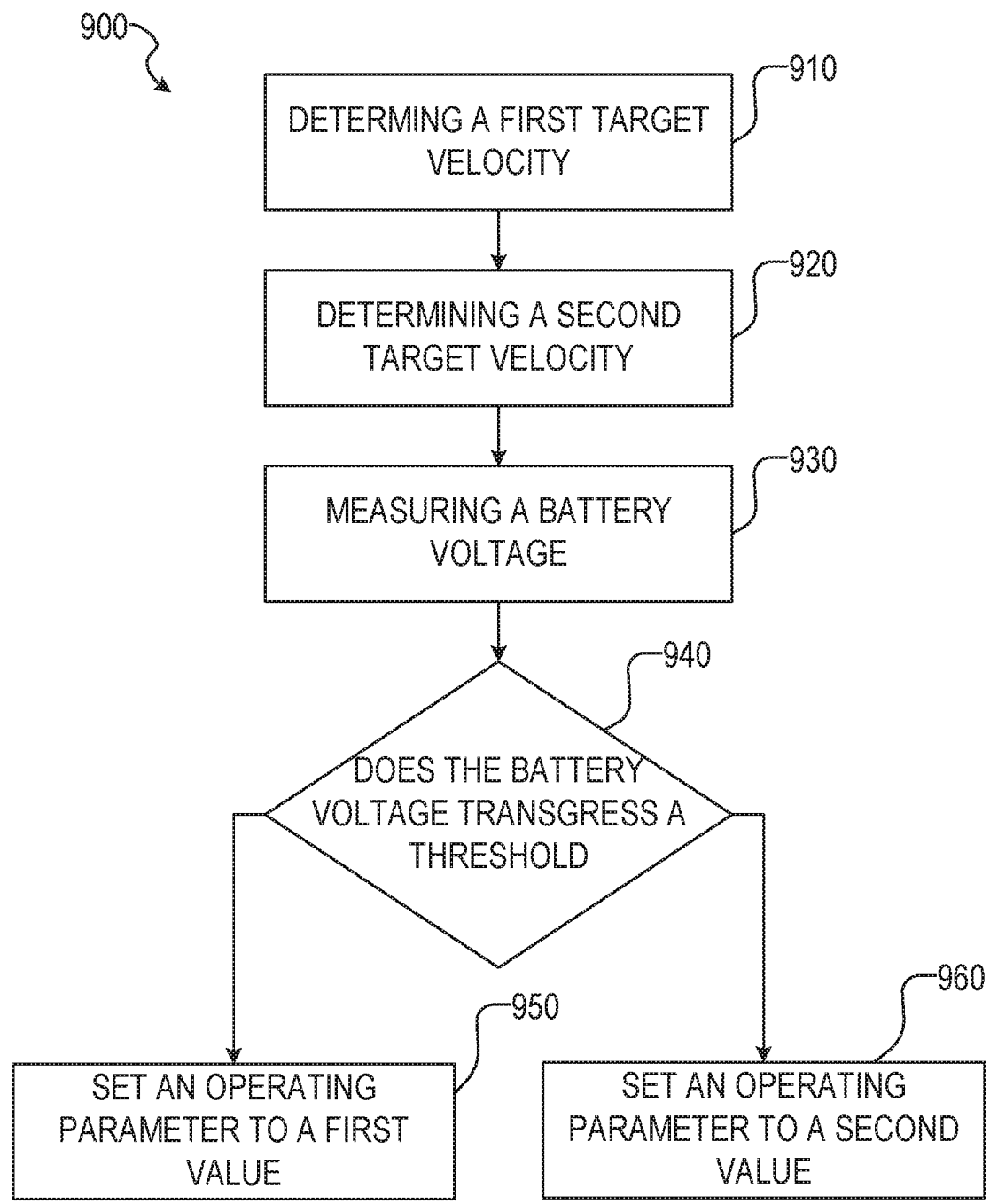

FIGS. 8 and 9 include flowcharts illustrating example drive mechanism control schemes based at least in part on different operating zones based on battery voltage levels. In devices utilizing motors powered by batteries, the available battery voltage can have a direct effect on the speed (velocity) the motor is able to operate at, with the higher the available voltage the higher the speed. Batteries generally have a range of operating voltages that they deliver from fully charged to a low battery level (systems are usually designed not to completely deplete/discharge a battery). During the discharge cycle, the voltage supplied by a battery will gradually decrease until a battery management system (BMS) shuts down the battery to avoid damage from discharge. For example, in a particular design of the lacing engine discussed herein, a battery with an operating voltage range of 4.3 v to 3.6 v can be used. Over this operating range the motor will naturally exhibit a potentially wide variation in output speed, without some form of motor control. In certain devices a variable in motor output speed can result in a negative consumer impression and/or an undesirable variation in perceived or actual performance. For example, a lacing engine may exhibit an undesirable variation in the maximum amount of lace tightness or an undesirable variation in the time it takes to attain a desired tightness level.

Accordingly, to resolve these potentially undesirable performance variations, a motor control scheme was devised to smooth out the motor output speed over at least a portion of the voltage operating range of the motor. In this example, two operating zones were chosen so that over a portion of the operating range the motor can be operated at a level of performance above what is possible at the low end of the operating voltage range, while still eliminating some of the undesirable variations in performance. Use of this scheme can also provide the benefit of delivering a more consistent user experience, such as speed of operation and audible motor sounds during operation.

In this example, a voltage threshold is selected as the lower end of a primary operating voltage range. In some examples, a desired operating speed is selected instead of or as a means of determining a threshold voltage. In these examples, the motor being used has a more or less direct relationship between input voltage and output speed (velocity), accordingly choosing one ends up determining the other. At the selected or determined voltage threshold, the motor can be operated at 100% duty cycle to attain a target output speed. At voltages above the threshold voltage, the motor can be operated at less than 100% duty cycle to enable the motor to maintain the target output speed. Accordingly, at all operating voltage deliverable by the battery above the threshold voltage, the motor can be operated at a constant output speed. The control scheme provides a more consistent user experience in terms of performance, including lace tightening speed, tension, and audible feedback to the user. One additional benefit, results for an operating parameter, such as audible feedback, changing when the battery voltage drops below the threshold voltage. Such a change in a noticeable operating parameter can be an indication to a user that the battery needs to be charged.

In this example, once the battery voltage drops below the threshold voltage the system performance drops to a level consistent with the lowest operating voltage (sometimes referred to as the critically low battery level). The drop in output performance of the drive system can be an indicator to the user that the battery needs to be charged soon. The drop in performance can be designed in such a way to allow for a period of continued operation at the lower performance level.

In an example lacing system, a battery with an operating range of 4.3 v to 3.6 v can be used. In this system, a threshold voltage of 3.8 v can be selected. At battery voltages above 3.8 v, the system operates at a target output speed equal to the output speed at 100% duty cycle at 3.8 v. Accordingly, when the battery is fully charged (4.3 v) the processor circuit 1020 can modulate the power delivered to the motor to attain the target output speed. Accordingly, at 4.3 v the motor will be operated at something less than 100% duty cycle. Once the voltage deliverable by the battery drops below 3.8 v, the system drops performance to so that the target output speed is equal to the output speed at 100% duty cycle at 3.6 v (critically low battery level in this example system).

FIG. 8 is a flowchart illustrating a motor control technique 800, according to an example embodiment. In this example, the system 1000 can implement the motor or drive system control technique 800 including operations such as segmenting an operating range (810), defining a plurality of moves (820), creating a plurality of motion profiles (830), and commanding movements (840).

Motor control technique 800 can begin at operation 810 with the processor circuit 1020 segmenting an operating range, such as continuum of travel 410, into different control segments. In some examples, at 810 the processor circuit 1020 accesses a set of control segments for a particular operating range, as the set of control segments can be predetermined for a particular system. As illustrated in FIG. 4, the control segments can include segments ranging from detangling segments 415 to max tightness segments 440. Each control segment can represent a different amount of travel, expressed in degrees of rotation or linear distance. Segmenting the continuum of travel into different sized segment can simplify motion profiles using the control segments by automatically varying the movement sizes based on where along the continuum of travel the system is operating. For example, a single button push when the footwear platform is in a home (loose) state, can result in a much greater amount of lace travel being commanded versus when the footwear platform is near a maximum tightness state. In certain examples, the definition of control segments is performed outside the system 1000, with operating instructions for system 1000 utilizing the preprogrammed control segments. In these examples, the processor circuit 1020 can access preprogrammed control segment from a data structure stored in memory within system 1000.

At 820, the motor control technique 800 can continue with the processor circuit 1020 defining (or accessing) a plurality of motor moves. The motor moves can be defined in terms of control segments, such as move two home segments 420 and three comfort segments 425. The motor moves can also include performance parameters, such as acceleration, velocity, and deceleration. In some examples, the motor moves can include a distance parameter defined in terms of control segments, degrees of rotation, or linear travel distance. Operation 820 is another operation which can be preprogrammed into the instructions loaded into system 1000, in this scenario processor circuit 1020 can access preprogrammed motor moves from a table or similar data structure stored in memory on system 1000.

At 830, the motor control technique 800 can continue with processor circuit creating (or accessing) a plurality of motion profiles. The motion profiles can include one or more motor moves. The motor moves within a motion profile can be defined to reach different states for the footwear platform, such as a loose (home) state or a maximum tightness state. Operation 830 is another operation that can be preprogrammed into instructions loaded into system 1000, when preprogrammed the processor circuit 1020 accesses motion profiles when commanding movements.

At 840, the motor control technique 800 continues with processor circuit 1020 using motion profiles to command movements of drive mechanism 1040. Commanding movements can include selecting motion profiles based on a current location along a travel continuum. For example, the processor circuit 1020 only selects a return home motion profile, when the system is in a location away from the home position.

FIG. 9 is a flowchart illustrating a motor control technique 900, according to example embodiments. In some examples, the motor control technique 900 further defines how the processor circuit 1020 commands movement according to operation 840 discussed above. In other examples, the motor control technique 900 can be implemented independently of operation 840 or motor control technique 800. In the illustrated example, the motor control technique 900 can include operations such as determining a first target velocity (910), determining a second target velocity (920), measuring a battery voltage (930), determining if the battery voltage transgresses a threshold (940), and setting a operating parameter accordingly (950, 960).

At 910, the motor control technique 900 can begin with the processor circuit 1020 determining (or accessing) a first target motor output velocity. In certain examples, the first target motor output velocity is determined based on determining an output velocity of the motor at a threshold battery voltage with the system operating at 100% duty cycle. In some examples, the first target velocity is preprogrammed into the system 1000, and the processor circuit 1020 merely accesses the first target velocity at operation 910.

At 920, the motor control technique 900 can continue with the processor circuit 1020 determining (or accessing) a second target motor output velocity. In certain examples, the second target motor output velocity is determined based on determining an output velocity at a critically low battery level (e.g., a lowest allowable operating voltage) with the system operating at 100% duty cycle. In some example, the second target velocity is preprogrammed into the system 1000, and the processor circuit 1020 merely accesses the second target velocity at operation 920.

In certain examples, the operations 910 and 920 are performed outside the real-time operation of system 1000. In these examples, the first and second target motor output velocities can be determined or selected. In an example, a threshold battery voltage can be selected and used to determine the first and second target motor output velocities. In another example, a first target motor output velocity can be selected and used to determine a threshold voltage level. In this example, the threshold voltage level is the level at which the system can attain the selected first target motor output velocity while running at 100% duty cycle.

At 930, the motor control technique 900 can continue with the processor circuit 1020 receiving a signal indicative of the current battery output voltage that is being delivered to the drive mechanism 1040. In certain examples, the processor circuit 1020 can include a volt meter, in other examples the battery, BMS, or another component can provide the necessary signal indicative of voltage level to the processor circuit 1020.

At 940, the motor control technique 900 continues with the processor circuit 1020 using the voltage level indication to determine whether the voltage being delivered to the motor transgresses a threshold voltage. As discussed above, in some examples, the system 1000 can be operated with a certain voltage range with certain operating parameters and in a second voltage range with a second set of operating parameters.

If the voltage measured being delivered to the motor transgresses the threshold voltage, then the motor control technique 900 continues at 950 with the processor circuit 1020 operating the drive system 1040 using a first set of operating characteristics (with at least one operating parameter set to a first value). In an example, the controlled operating parameter is output velocity for the motor, and the motor is controlled across a range of input voltages at a single output velocity at operation 950.

If the voltage measured being delivered to the motor does not transgress the threshold voltage, then the motor control technique 900 continues at 960 with the processor circuit 1020 operating the drive system 1040 using a second set of operation characteristics. The operating characteristics includes at least one operating parameter, which in this example is motor output velocity. In this example, the motor output velocity is operated at a second target velocity when the battery voltage falls below a predetermined threshold voltage. The operating characteristic being controlled could also be current or duty cycle, among others.

The following examples provide additional details on the motor control techniques discussed above.

EXAMPLES

The present inventors have recognized, among other things, a need for an improved motor control of a motorized lacing engine for automated and semi-automated tightening of shoe laces. This document describes, among other things, a homing mechanism for assisting in controlling a motorized lacing engine within a footwear platform. The following examples provide a non-limiting examples of a homing mechanism and a method of using a homing mechanism within a lacing engine in the footwear assembly discussed herein.

Example 1 describes subject matter including a homing apparatus within a drive mechanism of a lacing engine for an automated footwear platform. In this example, the homing apparatus can include an indexing wheel, a plurality of Geneva teeth and a stop tooth. The plurality of Geneva teeth can be distributed around a portion of a perimeter of the indexing wheel. Each Geneva tooth of the plurality of Geneva teeth can include side profiles conforming to a first side profile that generates a first force when engaged by an index tooth on a portion of the drive mechanism. The stop tooth can be located along the perimeter of the indexing wheel between two Geneva teeth. Additionally, the stop tooth can include side profiles conforming to a second side profile that generates a second force when engaged by the index tooth.

In example 2, the subject matter of example 1 can optionally include the second force being larger than the first force.

In example 3, the subject matter of example 2 can optionally the second force being large enough to stall the drive mechanism to provide indication of reaching a home position. Alternatively, example 3 can optionally include the second force generating a force profile unique to the index tooth engaging the stop tooth.

In example 4, the subject matter of any one of examples 1 to 3 can optionally include the first side profile including a curve. In this example, the first side profile operates to smooth out the force profile generated by the index tooth engaging one of the Geneva teeth.

In example 5, the subject matter of any one of examples 1 to 4 can optionally include each Geneva tooth of the plurality of Geneva teeth including a first side and a second side. In this example, the first side can be shaped according to the first side profile and the second side can be a mirror image of the first side.

In example 6, the subject matter of any one of examples 1 to 5 can optionally include a portion of the drive mechanism having the index tooth that is an offset circular portion of a gear. In this example, a superior surface of the offset circular portion can form a circle with a flat portion including the index tooth.

In example 7, the subject matter of example 6 can optionally include each Geneva tooth of the plurality of Geneva teeth including a radiused outer edge having a radius conforming to the circular portion of the offset circular portion of the drive mechanism.

In example 8, the subject matter of any one of examples 1 to 7 can optionally include the plurality of Geneva teeth consisting of four Geneva teeth, and the homing apparatus can allow for four complete revolutions of the portion of the drive mechanism including the index tooth between home locations.

In example 9, the subject matter of any one of examples 1 to 8 can optionally include the generation of the second force including a force profile with a steep slope, wherein the force profile is indicative of a magnitude and a rate of the change in force.

In example 10, the subject matter of example 9 can optionally include the lacing engine having a processor circuit, and the processor circuit being configured to detect the force profile created by the generation of the second force.

In example 11, the subject matter of example 10 can optionally include the processor circuit being further configured to distinguish the force profile created by the generation of the second force from a second force profile created by the generation of a third force.

In example 12, the subject matter of example 11 can optionally include the third force being transmitted to the lacing engine from the footwear platform through a lace cable.

Example 13 describes a method of using a homing mechanism to home a drive mechanism within a lacing engine. In this example, the method can include the following operations. Commanding the drive mechanism to turn a gear including an index tooth that engages a homing apparatus, where the homing apparatus can include a plurality of Geneva teeth and one stop tooth. Detecting a force associated with the index tooth engaging the homing apparatus. Identifying a home position based on detecting when the force matches a pre-determined force profile.

In example 14, the subject matter of example 13 can optionally include detecting when the force matches a pre-determined force profile including detecting that the force exceeds a pre-determined threshold force.

In example 15, the subject matter of example 13 can optionally include detecting when the force matches a pre-determined force profile including detecting a force profile with a high rate of change.

In example 16, the subject matter of example 13 can optionally include detecting when the force matches a pre-determined force profile including detecting a force profile with a high magnitude and a high rate of change.

In example 17, the subject matter of example 13 can optionally include upon detecting a force profile matching the pre-determined force profile putting the drive mechanism in a home state.

Example 18 describes a lacing engine for an automated footwear platform including a homing mechanism. The lacing engine can include a spool and a drive mechanism. The spool can be adapted for receiving a portion of a lace for securing the footwear platform to a user's foot. The drive mechanism can be adapted for rotating the spool about a first axis to take up or release lace from the spool. The drive mechanism can include a worm gear and a homing mechanism. The worm gear can include an index tooth. The homing mechanism can include an indexing wheel adapted to engage the index tooth and stall the drive mechanism at least one rotational position. The indexing wheel can include a plurality of Geneva teeth and a stop tooth. The plurality of Geneva teeth can be distributed around a portion of a perimeter of the indexing wheel. The stop tooth can be located along the perimeter of the indexing wheel between two Geneva teeth, with the stop tooth being adapted to stall the drive mechanism.

In example 19, the subject matter of example 18 can optionally include each Geneva tooth of the plurality of Geneva teeth having side profiles conforming to a first side profile that generates a first force when engaged by an index tooth on a portion of the drive mechanism.

In example 20, the subject matter of example 19 can optionally include the stop tooth having side profiles conforming to a second side profile that generates a second force when engaged by the index tooth.

In example 21, the subject matter of example 20 can optionally include a processor circuit configured to determine whether a detected force is a first force generated by a Geneva tooth or a second force generated by a stop tooth.

ADDITIONAL NOTES

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The disclosure, therefore, is not to be taken in a limiting sense, and the scope of various embodiments includes the full range of equivalents to which the disclosed subject matter is entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein, such as the motor control examples, can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. An Abstract, if provided, is included to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention includes:

1. A homing apparatus within a drive mechanism of a lacing engine for an automated footwear platform, the homing apparatus comprising:
   an indexing wheel
   an index tooth coupled to a shaft within the drive mechanism that rotates in coordination with rotation of a lace spool portion of the lacing engine;
   a plurality of Geneva teeth distributed around a portion of a perimeter of the indexing wheel, each Geneva tooth of the plurality of Geneva teeth including side profiles conforming to a first side profile that generates a first force when engaged by the index tooth; and
   a stop tooth located along the perimeter of the indexing wheel between two Geneva teeth, the stop tooth includes side profiles conforming to a second side profile that generates a second force when engaged by the index tooth.

2. The homing apparatus of claim 1, wherein the second force is larger than the first force.

3. The homing apparatus of claim 2, wherein the second force is large enough to stall the drive mechanism to provide indication of reaching a home position.

4. The homing apparatus of claim 1, wherein the first side profile includes a curve.

5. The homing apparatus of claim 1, wherein each Geneva tooth of the plurality of Geneva teeth includes a first side and a second side, where the first side is shaped according to the first side profile and the second side is a mirror image of the first side.

6. The homing apparatus of any one of claim 1, wherein the portion of the drive mechanism including the index tooth is an offset circular portion of a gear, wherein a superior surface of the offset circular portion forms a circle with a flat portion including the index tooth.

7. The homing apparatus of claim 6, wherein each Geneva tooth of the plurality of Geneva teeth includes a radiused outer edge having a radius conforming to the circular portion of the offset circular portion of the drive mechanism.

8. The horning apparatus of claim 1, wherein the plurality of Geneva teeth consist of four Geneva teeth, and the homing apparatus allows for four complete revolutions of the portion of the drive mechanism including the index tooth between home locations.

9. The homing apparatus of claim 1, wherein the generation of the second force includes a force profile with a steep slope, wherein the force profile is indicative of the rate of the change in force.

10. The homing apparatus of claim 9, wherein the lacing engine includes a processor circuit, and the processor circuit is configured to detect the force profile created by the generation of the second force.

11. The homing apparatus of claim 10, wherein the processor circuit is further configured to distinguish the force profile created by the generation of the second force from a second force profile created by the generation of a third force.

12. The homing apparatus of claim 11, wherein the third force is transmitted to the lacing engine from the footwear platform through a lace cable.

13. A lacing engine for an automated footwear platform, the lacing engine comprising:
- a spool for receiving a portion of a lace for securing the footwear platform to a user's foot; and
- a drive mechanism for rotating the spool about a first axis, the drive mechanism including,
- a worm gear including an index tooth; and
- a homing mechanism including a indexing wheel adapted to engage the index tooth and stall the drive mechanism at least one rotational position;
- wherein the indexing wheel includes a plurality of Geneva teeth and a stop tooth;
- wherein the plurality of Geneva teeth are distributed around a portion of a perimeter of the indexing wheel; and
- wherein the stop tooth is located along the perimeter of the indexing wheel between two Geneva teeth, the stop tooth adapted to stall the drive mechanism.

14. The lacing engine of claim 13, wherein each Geneva tooth of the plurality of Geneva teeth including side profiles conforming to a first side profile that generates a first force when engaged by an index tooth on a portion of the drive mechanism.

15. The lacing engine of claim 14, wherein the stop tooth includes side profiles conforming to a second side profile that generates a second force when engaged by the index tooth.

16. The lacing engine of claim 15, further comprising a processor circuit configured to determine whether a detected force is a first force generated by a Geneva tooth or a second force generated by a stop tooth.

* * * * *

UNITED STATES PATENT AND TRADEMARK OFFICE
CERTIFICATE OF CORRECTION

PATENT NO. : 10,463,109 B2  
APPLICATION NO. : 15/459754  
DATED : November 5, 2019  
INVENTOR(S) : Schneider et al.

Page 1 of 1

It is certified that error appears in the above-identified patent and that said Letters Patent is hereby corrected as shown below:

In the Claims

In Column 18, Line 20, in Claim 1, after "wheel", insert --;--

In Column 18, Line 55, in Claim 8, delete "horning" and insert --homing-- therefor In Column 19, Line 6, in Claim 12, delete "horning" and insert --homing-- therefor Signed and Sealed this  
Thirteenth Day of September, 2022

Katherine Kelly Vidal  
*Director of the United States Patent and Trademark Office*